United States Patent
Adl-Tabatabai et al.

(10) Patent No.: US 8,719,514 B2
(45) Date of Patent: May 6, 2014

(54) SOFTWARE FILTERING IN A TRANSACTIONAL MEMORY SYSTEM

(75) Inventors: Ali-Reza Adl-Tabatabai, San Jose, CA (US); David Callahan, Seattle, WA (US); Jan Gray, Bellevue, WA (US); Vinod Grover, Mercer Island, WA (US); Bratin Saha, Santa Clara, CA (US); Gad Sheaffer, Haifa, IL (US)

(73) Assignee: Intel Corporation, Santa Clara, CA (US)

( * ) Notice: Subject to any disclaimer, the term of this patent is extended or adjusted under 35 U.S.C. 154(b) by 572 days.

(21) Appl. No.: 12/653,471

(22) Filed: Dec. 15, 2009

(65) Prior Publication Data

US 2010/0218195 A1 Aug. 26, 2010

Related U.S. Application Data

(63) Continuation-in-part of application No. 11/769,094, filed on Jun. 27, 2007.

(51) Int. Cl.
*G06F 13/00* (2006.01)

(52) U.S. Cl.
USPC .................................. 711/150; 711/E12.091

(58) Field of Classification Search
None
See application file for complete search history.

(56) References Cited

U.S. PATENT DOCUMENTS

| | | | |
|---|---|---|---|
| 2007/0028056 A1* | 2/2007 | Harris | 711/150 |
| 2008/0177955 A1* | 7/2008 | Su | 711/154 |
| 2010/0169577 A1 | 7/2010 | Kiyota | 711/125 |
| 2010/0332766 A1* | 12/2010 | Zeffer et al. | 711/144 |
| 2013/0304996 A1* | 11/2013 | Venkataraman et al. | 711/150 |

* cited by examiner

*Primary Examiner* — Sean D Rossiter
(74) *Attorney, Agent, or Firm* — Trop, Pruner & Hu, P.C.

(57) ABSTRACT

A method and apparatus for utilizing hardware mechanisms of a transactional memory system is herein described. Various embodiments relate to software-based filtering of operations from read and write barriers and read isolation barriers during transactional execution. Other embodiments relate to software-implemented read barrier processing to accelerate strong atomicity. Other embodiments are also described and claimed.

20 Claims, 11 Drawing Sheets

SOFTWARE FILTERING IN A TRANSACTIONAL MEMORY SYSTEM

RELATED APPLICATION

The present application is a continuation of U.S. patent application Ser. No. 11/769,094, filed on Jun. 27, 2007, entitled USING EPHEMERAL STORES FOR FINE-GRAINED CONFLICT DETECTION IN A HARDWARE ACCELERATED STM. The contents of which are fully incorporated by reference herein it their entirety.

FIELD

This invention relates to the field of processor execution and, in particular, to execution of groups of instructions.

BACKGROUND

In multi-threaded systems, contention can arise between threads for access to the same memory address or object. To avoid such contention, transactional memory systems may be employed. Transactional memory allows programmers to specify regions of the program that must appear to execute atomically. Transactional memory implementations then optimistically execute these transactions concurrently in different threads to obtain higher performance than serial code. Weak atomicity guarantees that one transaction will not interfere with another transaction. To implement weak atomicity, read and write barriers may be implemented in code for transactions.

Strong atomicity (also known as strong isolation) guarantees that transactions are isolated from non-transactional accesses. This provides a strong guarantee to the programmer that no other thread can interfere with the state observed or modified by a transaction until the transaction commits. Implementations of strong atomicity in software are often perceived as being expensive because the compiler instruments non-transactional memory accesses with high-overhead barrier operations. For this reason, many software transactional memory systems (STMs) provide only weak atomicity guarantees.

BRIEF DESCRIPTION OF THE DRAWINGS

The present invention is illustrated by way of example and not intended to be limited by the figures of the accompanying drawings.

DETAILED DESCRIPTION

Figure 1:
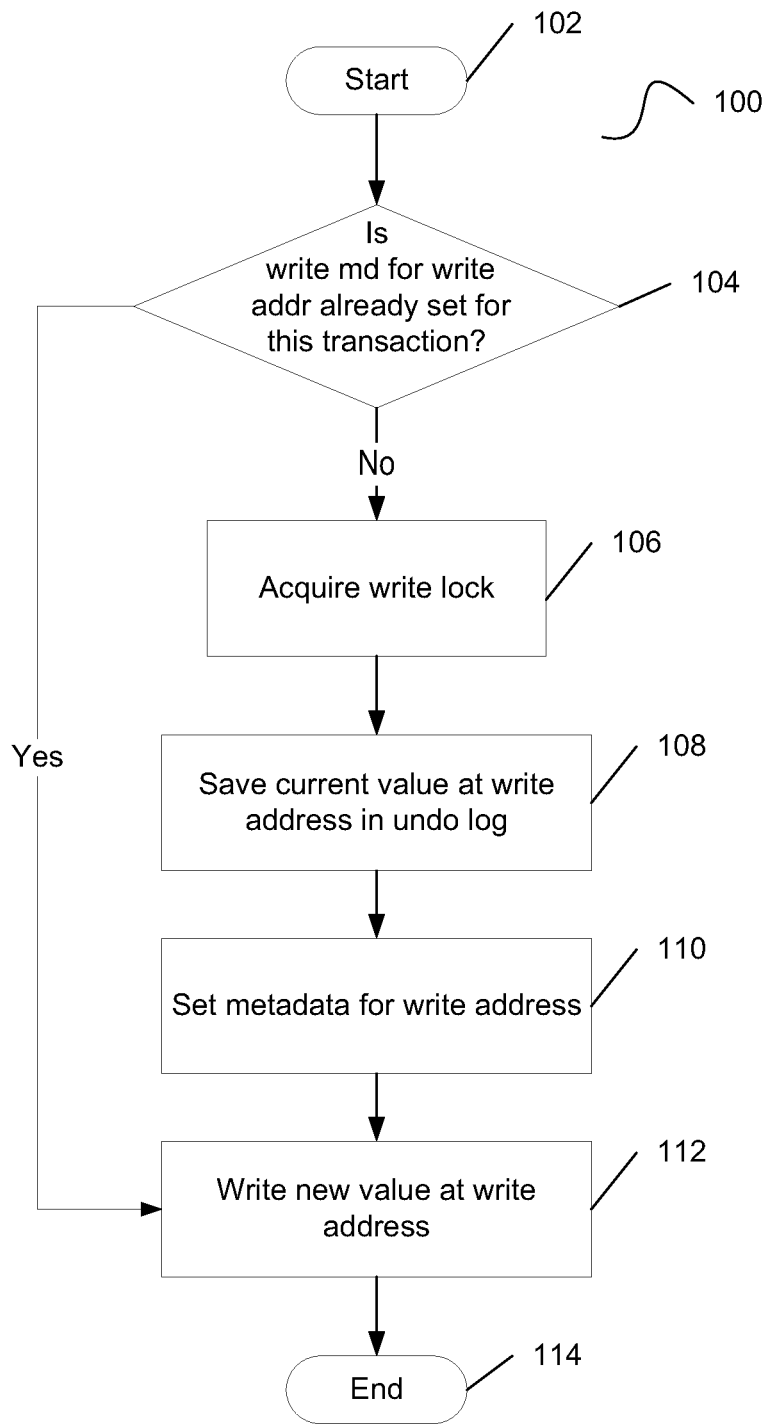
FIG. 1 illustrates at least one embodiment of a method for filtering redundant undo logging operations in a write barrier, based on hardware metadata values.

In the following description, numerous specific details are set forth such as examples of specific hardware structures for transactional execution, specific types and implementations of access monitors, specific types of cache coherency models to detect access conflicts, specific data granularities, and specific types of memory accesses and locations, etc. in order to provide a thorough understanding of the present invention. It will be apparent, however, to one skilled in the art that these specific details need not be employed to practice the present invention. In other instances, well known components or methods, such as coding of transactions in software, insertion of operations to perform instrumented functions by a compiler, demarcation of transactions, specific and alternative multi-core and multi-threaded processor architectures, specific compiler methods and implementations, and specific operational details of microprocessors, have not been described in detail in order to avoid unnecessarily obscuring the present invention.

The methods and apparatuses described herein are for software techniques for read and write barriers in transactional execution system. Various embodiments relate to filtering of operations from read and write barriers and read isolation barriers during transactional execution. Other embodiments relate to read barrier processing to accelerate strong atomicity. The method, system and apparatus embodiments described herein may be utilized within any form of transactional memory system. Some such systems may include pure hardware transactional memory systems (HTMs). However, many of the embodiments disclosed herein describe a hybrid transactional memory system that utilizes hardware to support or accelerate software transactional memory systems (STMs). At least one such hybrid transactional memory system may be referred to herein as a UTM (Unbounded Transactional Memory). Of course, alternative embodiments of a system on which the disclosed techniques may be employed may include different or additional features than those disclosed herein in order to implement various hybrids of software and hardware transactional memory support.

Software transactional memory systems (including hybrid systems that utilize hardware mechanisms to support software transactional memory) may implement read and write barrier operations to detect memory access conflicts between threads and to manage multiple data versions. For at least one embodiment, the barriers are inserted as system calls into code during compilation of code sequences that are indicated by the programmer to be atomic code sequences. The compiler may instrument load instructions of an atomic code sequence to insert a "read barrier". The inserted read barrier instrumentation code may include inline code. Alternatively, the compiler may insert a call to a library routine. Either way, the code invoked by the read barrier function call may include operations to be performed in order to verify that a thread may access a particular memory location without interference from another thread.

Similarly, a compiler may instrument write instructions of an atomic code sequence to insert a "write barrier". Again, the compiler may insert inline code for the write barrier function. Alternatively, the compiler may simply insert a call to a runtime routine. The code of the write barrier function may include operations to be performed to verify that a thread may modify the contents of a particular memory location, and also handle conflict resolution for the write operation. The conflict detection may include any of several different approaches. For one approach, the write barrier code may include instructions to save the previous value of the memory location before overwriting it. For another approach, the write barrier code may include instructions to buffer the new value for the memory location until a commit or abort is to be performed.

Accordingly, the barrier operations track addresses of memory locations accessed within an atomic transaction. For example, software transactional memory systems (STMs) may maintain a log for the memory locations read inside an atomic transaction. Similarly, STMs may maintain a log for the memory locations written inside an atomic transaction. Often, redundancies may occur at runtime, such that the same address is logged multiple times within a transaction. While it may be possible to try to ameliorate some of these redundancies at compile-time, compile-based techniques are not usually able to detect and correct all redundancies. That is, compiler optimizations can remove some redundant logging operations but their effectiveness may be limited by, for example, compilation scope, ambiguous control flow, and pointer aliasing.

An STM library may provide logic to remove some of the logging redundancies at runtime, using a runtime technique called filtering. Filtering is a technique that checks addresses that have already been logged by a transaction and avoids redundant tracking of such addresses again in the same transaction.

For many systems, the overhead associated with software-based filtering of transaction addresses can slow down a program. The discussion below demonstrates efficiency gains when filtering is implemented on a system that employs certain hardware techniques in at least one embodiment of a hybrid software/hardware transactional memory system.

Discussed below are embodiments of filtering logic that are based on various underlying hardware transactional memory features, including hardware metadata, read monitoring, ephemeral cache lines, and/or buffered stores. The discussion below should not be taken to be limiting, in that various embodiments of filtering may be based on one or more of the underlying hardware features described herein, used alone or in combination with each other, or in combination with other hardware or software mechanisms. The embodiments discussed below may be used for filtering of read barrier operations (including redundant undo log operations), and for filtering of write barrier operations for atomic transactions in a multithreading environment.

Figure 2:
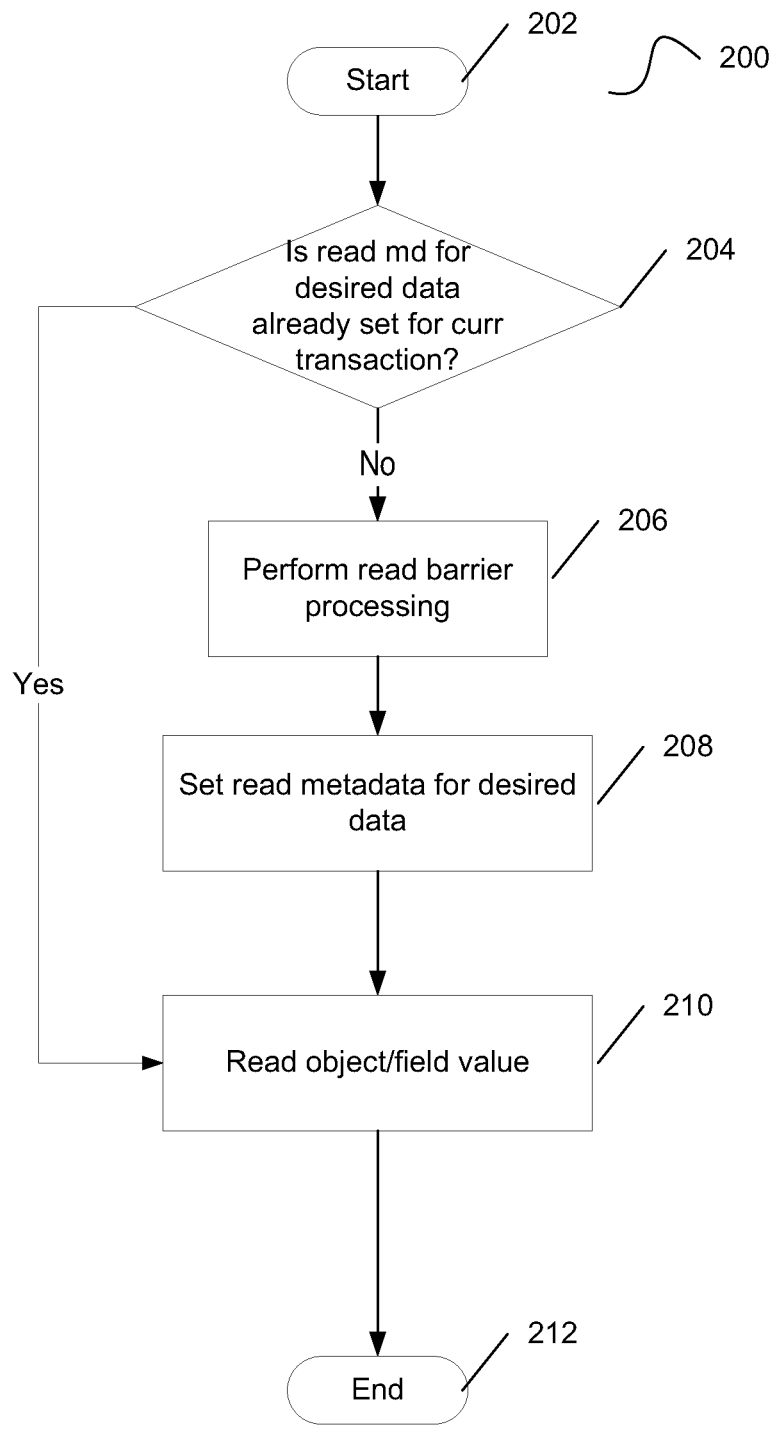
FIG. 2 illustrates at least one embodiment of a method for filtering redundant read barrier processing, based on hardware metadata values.
Figure 3:
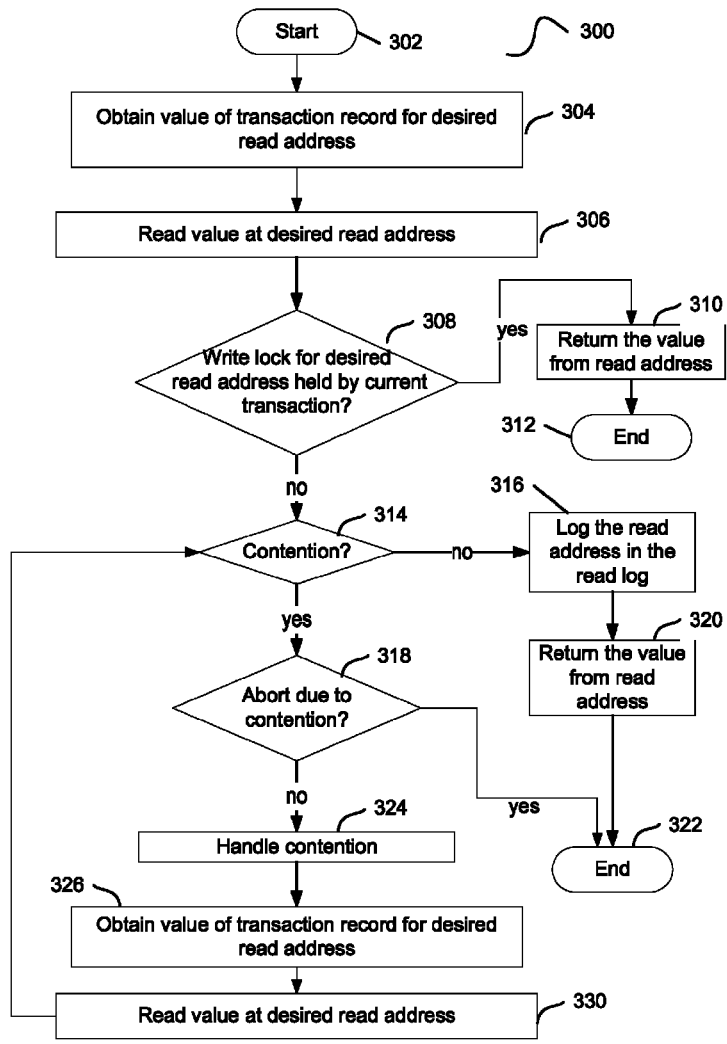
FIG. 3 illustrates at least one embodiment of a method for filtering redundant undo logging operations, based on hardware metadata values, in a write barrier for an address-based software transactional memory system that maintains read set consistency.

FIGS. 1, 2, and 3 illustrate various embodiments of software processing that may be utilized to filter out redundant operations from read and/or write barrier code based on underlying hardware mechanisms. While only certain permutations are shown, it should be noted that such underlying hardware mechanisms can be utilized to filter out redundant barrier processing for object-based as well as native language systems, for in-place update as well as lazy versioning systems, and for systems that maintain read set consistency as well as those that don't.

FIG. 1 is a control flow diagram illustrating at least one embodiment of a method 100 for filtering redundant operations from write barriers, implemented in software but utilizing an underlying hardware feature referred to herein as "metadata". For the various embodiments of the software technique illustrated in FIG. 1, hardware metadata may be implemented as any hardware mechanism by which hints are associated with data such that software may detect that a read or write address has already been accessed during a particular transaction.

Various potential embodiments of the underlying hardware metadata feature are discussed in further detail below in connection with FIG. 8. For purposes of a brief overview, it should be understood that at least one implementation of hardware metadata information is private to a single processor and cannot be seen or manipulated by another processor. A key aspect of at least one embodiment of hardware metadata is that it may decay to 0 at any point in program execution. Thus, when looking at a bit, reading a value of 1 represents a known fact while reading a value of 0 may indicate information has been lost. A use of metadata described here is a filtering hint to avoid redundant operations. When the operation is performed, some memory location is marked with a metadata bit for some compression ratio and context. As is described below, this bit may be tested to avoid redundancy but should it decay to 0 the system may safely repeat the operation and reset the bit.

FIG. 1 illustrates that at least one embodiment of a software-implemented method 100 for avoiding redundant operations in a write barrier for transactional memory systems begins at block 102 and proceeds to block 104. For at least one embodiment, the method 100 is performed in a transactional memory system that performs eager version management (also sometimes referred to as "in-place updates") and maintains an undo log (explained in further detail below).

At block 104 it is determined whether the underlying hardware mechanism, such as hardware metadata, indicates that the write address to be written by the current transaction has already previously been written by the same thread during the same transaction. If so, processing proceeds to block 112. In effect, if the evaluation at block 104 evaluates to a "true" value, then the operations at blocks 106, 108, 110 may be skipped. In this manner, the operations at blocks 106, 108 and 110 are "redundant" operations that are unnecessary to be performed if the same transaction has already written to the specified address. In such case, it is presumed that, during an earlier iteration of method 100 by the particular transaction, operations 106, 108 and 110 were already performed for the transaction. Thus, if the evaluation at block 104 evaluates to "true", such operations (106, 108, 110) may be skipped.

On the other hand, if the evaluation at block 104 evaluates to "false", then processing proceeds to block 106. In such case, it is presumably the first time that the current transaction has attempted to write to the specified memory location. (It should be understood by one of skill in the art that the term "write" as used herein may effect a write to a temporary memory location in a memory location, such as a cache, rather than to a write directly to the specified location in memory). In such case, a write lock is acquired by the thread executing the current transaction, for the desired memory location. Processing then proceeds from block 106 to block 108.

At block 108, the current value at the write address is saved in an undo log. It should be noted that the processing at block 108 is optional, in the sense that such processing might only be performed for systems that perform an eager versioning type of version management. In such systems, the new value is written to memory (or a cache), but the original version of the memory location is maintained in an undo log, which may be consulted if the current transaction is to be unrolled and the original values of the memory locations written inside the transaction should be restored.

From block 108, processing proceeds to block 110. At block 110, the underlying hardware metadata mechanism is modified to indicate that the specified memory address has been written by the current transaction. Processing then proceeds to block 112.

At block 112, the transaction writes the desired new value to the indicated memory location. It should be noted that, if the processing of block 112 is reached directly from the evaluation at block 104, then redundant undo logging operations at block 108 have been avoided in that they are not executed if the transaction has already written this indicated address during the current transaction. In this manner, the lock acquisition and undo logging operations at blocks 106 and 108, respectively, are "filtered" (that is, they are not redundantly executed) based on an indication by the underlying hardware metadata mechanism that the operations 108, 110 are redundant because the same address has already been written during the current transaction. Processing for the method 100 then ends at block 114.

Thus, FIG. 1 illustrates at least one embodiment of a method 100 that utilizes an underlying metadata hardware mechanism to filter out redundant undo log operations (see operation 108) and to filter out redundant write lock acquisition operations (see operation 110) from write barrier code for an address-based (as opposed to object-based) in-place update (eager versioning) software transactional memory processing. One of skill in the art will recognize that the method may be easily modified to apply to object-based systems as well.

Pseudocode for at least one embodiment of a software instruction sequence that can be utilized to implement the method 100 illustrated in FIG. 1 is set forth immediately below in Table 1.

For at least one embodiment, the pseudocode set forth in Table 1 may be inserted ("instrumented") into the compiled code for each write (store) operation within an atomic transaction. For at least one alternative embodiment, the compiler may partially inline code. Alternatively, rather than instrumenting all or part of the inline code corresponding to Table 1, the compiler may instead simply instrument a function call (see Row 1 of Table 1) to the tmWrUtm function (and required parameters) into the compiled code. For such embodiment, the code of the function (see rows 2 through 8 of Table 1) may instead be retrieved from a runtime library. Thus, the pseudocode in Table 1 combines, for ease of reference, the function call and parameters that would be passed by the compiler with the inline code that would be retrieved from the runtime library during execution.

TABLE 1

Psuedocode for write barrier with undo log filtering

```
1.  void tmWrUtm<Type>(TxnDesc* txnDesc,Type* addr,Type value) {
2.    if (movmd_load<Type>(addr) != widen<Type>(0xFF)) {
3.      acquireWriteLock(txnDesc,addr);
4.      logUndo<Type>(addr);
5.      movmd_store<Type>(addr,widen<Type>(0xFF));
6.    }
7.    *addr = value;
8.  }
```

Row 1 of Table 1 illustrates that the transactional memory write barrier code, tmWrUtm, is associated with a Type. That is, various embodiments of the write barrier code may be generated for each data type supported by the system (e.g., integer, float, double, etc.). For at least one embodiment, a runtime library includes a separate set of instructions that are functionally equivalent to the pseudocode in Table 1 for each supported data type that might be written by a thread during an atomic transaction.

Row 1 of Table 1 further illustrates that the tmWrUtm routine receives three input values: the transaction descriptor that uniquely identifies the current transaction that is attempting to perform a write operation, the address ("addr") of the memory location that the transaction is attempting to write, and the value that the transaction wished to write to the memory location. The input parameter represented in Row 1 of Table 1 as "Type *addr" is an address that points to some memory location that has a value of type Type. This parameter represents that data that is being sent into the function—it is the data that is to be written by the write/store operation in the current transaction.

Row 2 of Table 1 illustrates an evaluation. This evaluation at Row 2 of Table 1 roughly corresponds to the evaluation operation 104 of FIG. 1. The movemd_load and move_md store instructions of Table 1 load and store, respectively, hardware metadata values associated with the accessed address, addr. The movemd_load instruction, for example, loads (reads) metadata (for data type Type) for address that is to be written. If the write metadata for accessed address, addr, is not set, then it means that either a) the current thread has not written to the same location during the current transaction or b) the current thread has done so, but the metadata bit has nonetheless decayed to 0 (or some other value that indicates "not set"), during the transaction. If the write metadata bit is set, then it means that the current thread has written to location addr during the current transaction, has a write lock on the location, and has already performed an eager update to location addr in the memory hierarchy. For an eager versioning system, a "set" write metadata value also indicates that the pre-transaction value at location addr has been saved in an undo log.

The pseudocode at Row 2 of Table 1 thus indicates that the write barrier code of tmWrUtm checks whether the address, addr, has already been logged in the undo and that a write lock has been acquired. This is accomplished, as is described in the preceding paragraph, by determining whether the write metadata for the address, addr, has been set for the current transaction. If so, then redundant operations are skipped and processing falls through to Row 7 of Table 1.

Otherwise, if the write metadata for this address has not previously been set during the current transaction, then the original (pre-transaction) value at addr has not yet been logged in the undo log, and the following operations are performed. (It should be noted that the following operations will also be performed, with no adverse implications for correctness, if the write metadata bit for the address has been previously set during the transaction but has since decayed to zero. In such case, the current value at addr will be written to the undo log, even though it is an intermediate value. The true pre-transaction value at addr has already been logged during the prior iteration, when the write metadata bit was set, before the decay event).

Table 1 illustrates that, if the evaluation at Row 2 indicates that the write metadata bit is not set for memory location addr, then a write lock is acquired at Row 3. This processing roughly corresponds to operation 106 of FIG. 1. The original value (that is, the current pre-transaction value) of the memory location at addr is saved in the undo log (not shown) at Row 4 of Table 1. This processing roughly corresponds to operation 108 of FIG. 1. Then, at Row 5 of Table 1 the underlying hardware metadata is set for addr to indicate that the current transaction has overwritten the value at addr and that the pre-transaction value at addr has been logged in the undo log. This processing roughly corresponds to operation 110 of FIG. 1. By setting the write metadata bit in Row 5 processing, the system is now set up to avoid redundant undo logging for this same memory location later in the same transaction. This is true because, on the next iteration through the code of this function tmWrUtm, the metadata will already be set. Accordingly, the subsequent iteration will skip the processing at Rows 3-5 of Table, with the result that undo logging will not be repeated during the transaction. In other words, the redundant undo logging operations of the write barrier will be "filtered out" during the next iteration through the code.

At Row 7 of Table 1, the new desired value, which was passed into the write barrier code as "value", is written to addr. In other words, the write operation of the current transaction is performed at Row 7, and processing ends at Row 8.

FIG. 1 and Table 1 illustrate only one of the many potential embodiments for using hardware metadata to filter undo log operations in a write barrier, and such illustrative embodiments should not be taken to be limiting. FIG. 1 and Table 1 illustrate metadata-based undo log filtering for an address-based, in-place update (eager versioning) transactional memory system. This is not to say, however, that undo logging is never used for lazy versioning systems. That is, even in a lazy versioning transactional memory system, undo logging may be utilized to support roll-back of nested transactions. Thus, alternative embodiments may utilize metadata-based processing to filter undo logging operations for write-buffering transactional memory embodiments that are designed to implement lazy versioning with write buffering. For at least one such embodiment, for example, a variation of the metadata-based undo log filtering mechanisms described in FIG. 1 and Table 1 may be employed to facilitate rollback for nested transactions in a write-buffering software transactional memory system.

While the illustrated pseudocode in Table 1 is directed toward and address-based transactional memory system, one of skill in the art will recognize that the code may be easily modified for object-based systems. For example, pseudocode for the body of a write barrier for an object-based system could be as follows:

```
if(!movmd_load(&obj.f)) {
    txnOpenForWrite(th, obj);
    txnLog Undo (th, &obj.f);
    movmd_store(&obj.f, 1);
}
obj.f = t;
```

It is to be assumed that, in the preceding pseudocode, the movmd_store and movmd_load instructions are passed parameters that retrieve the write metadata indicator for the desired write location. Additional discussion of object-based pseudocode is set forth below in connection with Table 2.

FIGS. 2 and 3 are flowcharts each illustrating at least one embodiment of a method for filtering redundant read barrier operations, based on hardware metadata values. FIG. 2 illustrates at least one embodiment of a read barrier filtering method 200 for systems that 1) use pessimistic concurrency control for reads or 2) use optimistic concurrency control for reads but do not maintain read set consistency. FIG. 3 illustrates at least one embodiment of read barrier filtering method 300 for systems that do maintain read set consistency.

By way of general background relevant to FIGS. 2 and 3, it should be noted that there are various potential implementations for read barriers, including those for optimistic concurrency control for reads (further distinguished by those that do maintain read set consistency and those that don't) as well as those for pessimistic concurrency control for reads. Hardware metadata may be utilized to filter out redundant read barrier processing for each of these types of systems (e.g., optimistic w/o read set consistency, optimistic with read set consistency, and pessimistic). However, the type and number of read barrier operations that may be "filtered out" may differ among these different systems, as is seen in the discussion below.

FIG. 2 illustrates that the method begins at block 202 and proceeds to block 204.

At block 204, an evaluation of the read metadata for the desired read data is performed. For at least one embodiment, such as an address-based transactional memory system, the desired read data is indicated by a memory location address. For at least one other embodiment, such as an object-based transaction memory system, the read data is indicated by a base address. For various implementations, the base address that is sent to the read barrier function can be either the base address of an object or the address of the desired field within an object. In any event, no matter how the desired read data is indicated to the read barrier, the read barrier code determines at block 204 whether the read metadata associated with the desired read data is set. If so, then the same data location has already been read by the current thread during the current transaction, and because the metadata is still set we can assume that the location/object has been read at least once before during the transaction and that it has been logged into the read set. For a system that uses pessimistic concurrency control for reads, we can also assume that the thread has a read lock on the object/location. Thus, the read barrier processing at blocks 206 and 208 may be skipped (e.g., "filtered out") and the transaction can safely read the value of the data location again. Thus, processing proceeds from block 204 to block 210 if the determination at block 204 evaluates to "true".

If, on the other hand, the determination at block 204 evaluates to "false", then the read metadata for the desired read location is not set. It is assumed in such case that the current transaction has not previously read the data at the desired read location. Alternatively, the read metadata could have decayed to zero. In either case, it is appropriate to perform read barrier processing for the desired read data location. Thus, if the determination at block 204 evaluates to "false", then processing proceeds to block 206. At block 206, read barrier processing is performed.

For an object-based embodiment, the read barrier processing performed at block 206 opens an object for reading. For an address-based embodiment, the read barrier processing performed at block 206 opens an address for reading. For a pessimistic system, the processing at block 206 locks out all other threads from writing to the desired read location. For a pessimistic system, the processing 206 also logs the address/object into a read log so that it can release the lock on commit of the transaction. For optimistic systems, the processing at block 206 confirms that no other threads hold a write lock on the location, and then logs the location of the desired read data in a read log for the transaction. This read log will then be checked before committing the current transaction, to make sure that there were no interim writes to the desired read data location that would destroy the current transaction's atomicity.

After the read barrier processing is performed at block 206, processing proceeds to block 208. At block 208, the read metadata bit(s) for the desired read data location is set. Processing then proceeds to block 210. At block 210, the desired read operation is performed for the transaction. Processing then ends at block 212.

Thus, FIG. 2 illustrates at least one embodiment of a method 200 that utilizes an underlying metadata hardware mechanism to filter out redundant read barrier operations (see operation 206) from read barrier code for address-based and object-based software transactional memory systems. The method can be employed for both optimistic and pessimistic read barrier systems.

Pseudocode for at least one embodiment of an instruction sequence that can be utilized for the method 200 illustrated in FIG. 2 is set forth immediately below in Table 2. While the illustrated pseudocode is directed toward an object-based transactional memory system, one of skill in the art will recognize that the code may be easily modified for address-based systems. As with the pseudocode described above in connection with Table 1, the pseudocode in Table 2 may be fully or partially instrumented as in-line code by a compiler. Alternatively, only a function call to tmRUtm (and required parameters) is instrumented into the compiled code. For such embodiment, the code of the function (see rows 2 through 6 of Table 2) may instead be retrieved from a runtime library. Thus, the pseudocode in Table 2 combines, for ease of reference, the function call and parameters that would be passed by the compiler with the inline code that would be retrieved from the runtime library during execution.

TABLE 2

Pseudocode for read barrier w/o read set consistency

| | |
|---|---|
| 1. | void tmRdUtm (th, obj, f) { |
| 2. | if (!movmd_load (obj)) { |
| 3. | txnOpenForRead (th, obj); |
| 4. | movmd_store (obj, 1); |
| 5. | } |
| 6. | t = obj.f; |
| 7. | } |

Row 1 of Table 2 illustrates that the tmRdUtm routine receives two input values: the identifier ("th") of the thread that is executing the current transaction that is attempting to perform a write operation, and the address of data to be read. In the particular embodiment illustrated in Table 2, the addresses of the field ("1") and the object ("obj") to be read are passed in as parameters of the tmRdUtm function.

Row 2 of Table 2 illustrates an evaluation. This evaluation at Row 2 of Table 2 roughly corresponds to the evaluation operation 204 of FIG. 2. As with Table 1, the movemd_load and move and store instructions of Table 2 load and store, respectively, hardware metadata values associated with the desired read data, obj.f. The movemd_load instruction, for example, loads (reads) the read metadata for the field (obj.f) that is to be read. If the read metadata for obj.f is not set for the current thread, then the data has not yet been read by the current transaction of the current thread. In such case, processing proceeds to Row 3 of Table 2. Row 3 of Table 2 roughly corresponds to operation 206 of FIG. 2. Otherwise, processing proceeds to Row 6 of Table 2.

At Row 3 of Table 2, the object is opened for reading. As is explained above in connection with operation 206 of FIG. 2, such opening may include various operations, depending on whether the system performs pessimistic or optimistic read barriers. Processing then proceeds to Row 4 of Table 2.

At Row 4 of Table 2, the read metadata is set to indicate that the transaction has read the data at obj.f. Through the next pass of the tmRdUtm code, (e.g., if the same transaction attempts to read the value again), if the read metadata is still set for this data, then it means that the current transaction previously has read the same location. In such case, redundant operations are skipped and processing instead falls through to Row 6 of Table 2.

Accordingly, if the evaluation at Row 2 of Table 2 evaluates to false (indicating that the read metadata for the desired read location is already set), then the read barrier processing at Row 3 is skipped. In this manner, redundant read barrier processing is filtered out (in other words, it is not executed), if the same location has already been read by the current transaction.

At Row 6 of Table 2, the value of the desired field (f) is read from the location that was passed into the write barrier code as "obj". In other words, the read operation of the current transaction is performed at Row 6, and processing ends at Row 7.

FIG. 2 and Table 2 illustrate only one of the many potential embodiments for using hardware metadata to filter lock operations (pessimistic) or read logging operations (optimistic) in a read barrier, and such illustrative embodiments should not be taken to be limiting. For the embodiments illustrated, it is apparent that nearly all of the read barrier processing may be skipped if the hardware metadata indicates that read barrier processing has already been performed for the same location in the current transaction.

FIG. 3 is a flowchart illustrating at least one embodiment 300 of a method to filter out read barrier operations for an optimistic transactional memory system that maintains read-set consistency. While FIG. 3 and the corresponding table of pseudocode (Table 3, below) illustrate an address-based system, one of skill in the art will recognize that the illustrated concepts may also be applied to read barrier processing for object-based transactional memory systems that maintain read set consistency.

The method 300 illustrated in FIG. 3 logs transaction records in the read log (not shown) so that metadata is associated with transaction records. While time stamps could be used for one embodiment of the transaction records, for the embodiment 300 illustrated in FIG. 3, transaction metadata words are logged (stored) in the read log. Because address-based transaction memory schemes may hash data addresses to transaction records, more than one data address may hash to the same transaction record. Accordingly, FIG. 3 illustrates that using read monitors on the accessed address can remove additional redundant transaction records from the read log.

As used herein, the term "monitoring" may refer to a hardware feature, separate from hardware metadata, which may be utilized by a software transactional memory system to accelerate transactional memory processing. One such use and acceleration are shown in FIG. 3. The monitoring feature maintains in a logical processor's cache one or more of the read set, write set, and/or undo log for that logical processor's atomic transactions. The monitoring feature caches data close to one processor, but still makes it available to all processors in a globally coherent manner. Blocks of memory may be identified by a logical processor as either read monitored or write monitored. The read and write monitored feature is again private to a logical processor that may interact with the existing coherence machinery. If another processor or thread writes to any location in a read monitored block, then the read monitoring attribute is removed.

Monitoring may be spontaneously removed as well. Whenever a monitoring attribute is removed, the local logical processor that established that monitoring is notified. For various hardware embodiments that can be utilized for the method 300 of FIG. 3, monitoring can be established by using explicit instructions and/or can be established by executing in an operating mode where monitoring is established implicitly by most memory operations. A useful application of the monitoring hardware feature is to access a collection of data items and to have guarantees that, as long as monitoring has not been lost, no other processor has made a conflicting access to the data items.

As is stated above, FIG. 3 illustrates an optimistic read barrier system. That is, for at least one embodiment every address has a transaction record associated with it. The transaction record for a location is copied into a read set when the data is read, but the data is not locked. The read set will thus include transaction records for any location that has been read during the transaction. When it is time to commit a transaction, the read set is validated by confirming that each location in the read set has the same version at commit time as was recorded in the read set at the time the location was read during the transaction. That is, if another thread acquires a write lock and updates a memory location, the transaction record is updated accordingly to reflect that a change has been made to the value at that location.

FIG. 3 illustrates that the method 300 begins at block 302 and proceeds to block 304. Blocks 304 and 308 illustrate just one of many possible embodiments for accessing the hardware metadata for a desired read address. As is indicated above, for at least one embodiment, filtering metadata is associated with transaction records. Accordingly, one approach for evaluating metadata is to evaluate the transaction record for the desired read address. Thus, FIG. 3 illustrates that the value of the transaction record is obtained at block 304. (The contents of the transaction record are used later in the processing of the method, as is explained immediately below). Processing then proceeds to block 306.

At block 306, the desired read operation is performed. That is, the value at the desired read address is obtained. Processing then proceeds to block 308. At block 308, the metadata (which was obtained at block 304) associated with the transaction record is evaluated. If the metadata indicates that the current transaction holds a write lock on the desired read address, then all other writers are locked out and the transaction may freely read the desired data. Accordingly, the read value obtained at block 306 is returned as an output function value at block 310, and processing ends at block 312. The processing of blocks 308 through 312 represent the relatively simple case that the current transaction owns a write lock on the desired read data and therefore may freely read and write the location during the current transaction. In such case, read barrier processing, such as logging the read in a read log, need not be performed and is thus "filtered" out by virtue of not being executed.

If, however, the evaluation at block 308 is not true, then the case is not so simple. In such case, the current transaction does not own a write lock, and because the illustrative method 300 of FIG. 3 represents an optimistic system that does not obtain a lock for reads, there may therefore be contention for access to the desired location by other threads. Thus, if the evaluation at block 308 evaluates to "false", processing proceeds to block 314 to determine whether such contention exists.

At block 314, it is determined whether contention exists between the current thread and another thread for the desired read address. For at least one embodiment, contention is determined to exist if any item of the current thread's read set has been modified, or is currently being modified, by another thread. For at least one embodiment, contention may be determined to exist at block 314 if 1) another thread has acquired a write lock on the read address OR 2) another thread has already acquired a write lock, written the location, and released the write lock—all during the current transaction. (This latter condition can be detected by determining that read consistency for the current transaction's read set has been violated). If so, then the current transaction may not reliably utilize the value obtained at block 306. Thus, if contention is determined to exist at block 314, then processing proceeds to block 318. Otherwise, processing proceeds to block 316.

At block 316, no contention for the contents of the read address exists, so the data obtained at block 306 may be utilized by the current thread. If the read metadata is not already set, the read address is logged in the read log at block 316 and the metadata is set to indicate that the transaction has read the data. Hardware metadata may be used at block 316 to avoid redundant read logging as described above. The value at the read address is then returned at block 320 for use during the transaction. Processing then ends at block 322.

If, on the other hand, contention does exist for the contents of the read address, then further processing is performed at block 318. At block 318, it is determined whether the contention is of a type that should cause the current transaction to abort. If so, processing ends at block 322, without returning read data. For example, a type of contention that should cause the current transaction to abort occurs if another transaction holds a write loc on the transaction record of the address to be read, and that other transaction doesn't release the wrote lock within a reasonable amount of time. An example of contention that should cause the current transaction to abort occurs when if another transaction has updated any of the transaction records belonging to the addresses in the current transaction's read set.

If, instead, the contention is not a type of contention that requires abort of the current transaction, processing proceeds to block 324, where the contention is handled. After the contention has been handled, the current transaction tries again to read the desired data. Accordingly, processing proceeds to block 326, and then to block 330.

At blocks 326 and 330, respectively, processing to read the data at the desired read address is performed again in a manner substantially similar to that described above in connection with blocks 304 and 306. After the contents of the read address have again been obtained, processing proceeds back to block 314 to determine if there is contention for the address.

The read barrier processing and filtering discussed above for optimistic transactional memory systems that maintain read set consistency may be generally characterized by the pseudocode in Table 3.

TABLE 3

Pseudocode for read barrier w/read set consistency

```
Type tmRd<Type>(TxnDesc* txnDesc,Type* addr) {
    TxnRec* txnRecPtr = getTxnRecPtr(addr);
    TxnRec txnRec = *txnRecPtr;
    Type val = *addr;
    if (txnRec != txnDesc) {
        while (!validateAndLog(txnDesc,txnRecPtr,txnRec)) {
            /* retry */
            txnRec = *txnRecPtr;
            val = *addr;
        }
    }
    return val;
}
bool validateAndLog(TxnDesc* txnDesc,TxnRec* txnRecPtr,TxnRec txnRec) {
    if (isWriteLocked(txnRec) ||
        !checkReadConsistency(txnDesc,txnRecPtr,txnRec)) {
        handleContention(...);
        return false;
    }
    if (movmd_load<Type>(txnRecPtr) != widen<Type>(0xFF)) {
        logRead(txnDesc,txnRecPtr);
        movmd_store<Type>(txnRecPtr,widen<Type>(0xFF));
    }
    return true;
}
```

In sum, FIGS. 1 through 3 above illustrate methods for efficiently declining to repeat certain filtering operations based on underlying hardware metadata values. In general, the underlying hardware metadata supports transactional memory in that it maintains for each word of memory that is accessed from within a transaction information about whether specific bookkeeping operations have been performed where that bookkeeping operation need only be performed once during a transaction. (Further details regarding embodiments of how the underlying hardware metadata may be implemented are discussed in further detail below in connection with FIG. 8).

Figure 4:
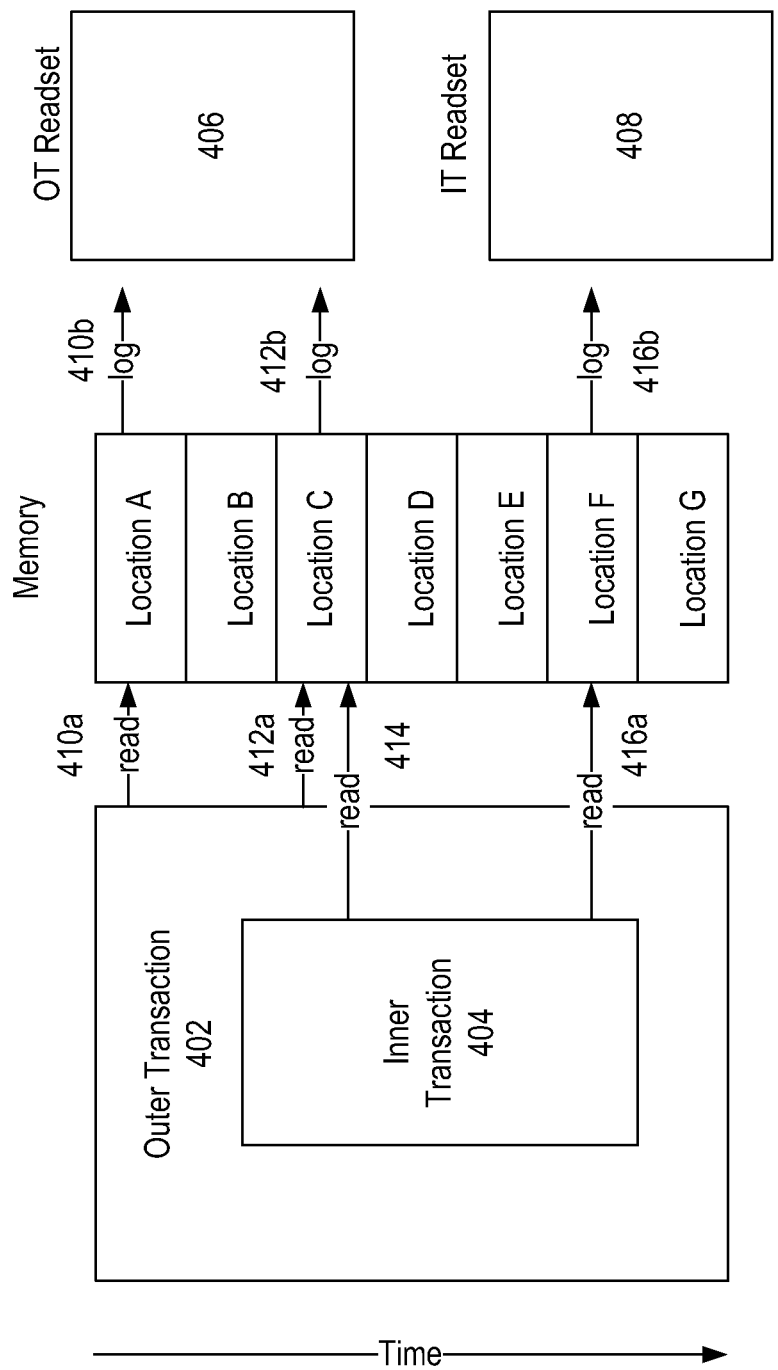
FIG. 4 is a block diagram illustrating at least one embodiment of example read operation processing for example closed nested transactions.

FIG. 4 is a block diagram illustrating at least one embodiment of a method 400 for filtering out unnecessary read barrier operations for "closed" nested transactions. A first atomic transaction 402, referred to as an "outer" transaction, includes in the body of its code a second atomic transaction, 404. The second transaction 404 is referred to herein as an "inner" transaction that is nested within the outer transaction. As used herein, "closed" nested transactions mean that the effects of the inner transaction are not visible outside of the outermost transaction until the outermost transaction commits. While the examples below include only two transactions in a closed nest, it should be understood that the techniques discussed herein may be applied to nests that include any number of transactions.

In a system that maintains metadata as described above, it may be desirable to allow nested transactions to rollback and replay without corrupting the state of the enclosing transaction. For such a rollback, the transactional memory system restores the state of the data to its pre-transaction state. However, it is also desirable to restore the state of the metadata to be consistent with the state of the system and data at the beginning of the inner transaction.

The execution of the inner transaction 402 is considered to be part of the outer transaction 404 for purposes of locking. Data that is locked by the outer transaction 402 may be accessed by the inner transaction 404 without creating a conflict between the transactions 404, 402. For example, the inner transaction 404 will read the most recent value of the read location as written by the outer transaction 402.

If an object (or word) has been opened for reading in an outer transaction, it is not necessary to repeat this action for an inner transaction. A conflict with the inner transaction is also a conflict with the outer transaction, so an intermediate rollback would not be useful. Thus, utilizing the metadata bit set by the outer transaction for a read of a particular address to avoid read barrier processing for an inner transaction that reads the same address yields desirable efficiencies in terms of avoiding the unnecessary repetition of read barrier processing. Any metadata filters set by the inner transaction may be correctly utilized for the outer transaction after the inner transaction commits, since, at commit of the inner transaction, the set of locations read by the inner transaction are logically added to those read by the outer transaction.

Filtering of memory barrier instructions may be performed for closed nested transactions, such as that illustrated in FIG. 4. In other words, if an object (or word) has been opened for reading in the parent transaction 402, repetition of this action may be filtered out on behalf of the child transaction 404. (In this description, the words parent and outer are used interchangeably, as are the terms child and inner).

FIG. 4 illustrates an example set of read operations in a set of nested transactions 402, 404. The outer transaction 402 reads two memory locations, location A and location C, before the inner transaction 404 is executed. The reads are performed at operations 410*a* and 412*a*, respectively. For each of these read operations 410*a*, 412*a* in the outer transaction 402, read barrier processing is performed. Such processing is illustrated by operations 410*b* and 412*b*.

For the particular embodiment of nested transactions illustrated in FIG. 4, a read set 406 for the outer transaction 402 is maintained, as well as a read set 408 for the inner transaction 404. The readset 408 for the inner transaction maintains, while the inner transaction 404 has not yet committed, a list of those addresses that have been read by the inner transaction 404. To achieve performance enhancements, it is desirable that the readset 408 for such situations maintain a list of those addresses that have been read by the inner transaction 404, but have not been read by the outer transaction 402. Filtering can help remove redundant addresses (e.g., addresses that have been read by the outer transaction 402) from the readset 408 of the inner transaction 404.

For example, FIG. 4 illustrates that the outer transaction 402 reads the contents of location A at operation 410*a*. The metadata is set to indicate that the current thread has read location A during the current (outer) transaction, and the metadata for location A is logged at operation 410*b* in the readset 406 of the outer transaction 402. Similarly, the outer transaction 402 reads the contents of location C at operation 412*a*. The metadata is set to indicate that the current thread has read location C during the current (outer) transaction, and the metadata for location C is logged at operation 412*b* in the readset 406 of the outer transaction. At operation 414, the inner transaction 404 also reads the contents of location C. According to at least one embodiment of the present invention, the metadata is not updated for the read operation 414. Nor is the read operation 414 logged in the readset 408 of the inner transaction. This is due to the feature of "filtering" proposed herein: when a memory location is read during a transaction and the metadata indicates that the location has been previously read or written by the current transaction or a parent transaction of the current transaction, then no additional barrier action need be performed. Thus, the use of metadata in this situation allows the filtering of unnecessarily repetitive read barrier operations. The readset 408 thus need not be modified for read operation 414.

Filtering of read barrier processing for operation 414 is represented by the absence in FIG. 4 of a log operation corresponding to read operation 414. Because the outer transaction 402 has recorded a read of location C in its readset 406 and has set the metadata for location C to indicate that it has been read during the outer transaction 402, read barrier processing may be eliminated for the read operation 414 by the inner transaction 404, because such processing would be redundant.

Consulting FIG. 2 in conjunction with FIG. 4, it can be seen that read barrier filtering for nested transactions, at least one embodiment of which is s illustrated in FIG. 4, is generally described by the method 200 of FIG. 2. For closed nested transactions, at least one embodiment of the read barrier processing according to the embodiment illustrated in FIG. 4 closely follows the processing illustrated in FIG. 2 as described above, with the following modifications. The determination of block 204 is not merely to determine if the metadata for the desired read address has been modified for the current transaction. Instead, for at least one embodiment of read barrier processing for nested transactions, the determination at block 204 checks to see if the metadata for the desired read address has been set for the current transaction, or for any parent transaction. In other words, block 204 will evaluate to true for closed nested transactions if any outer transaction has set the metadata and has not yet committed. For example, in FIG. 4 the evaluation at block 204 would evaluate to "true" for read operation 414 because, although the inner transaction 404 has not previously read location C, the outer transaction 402 has read the data at location C and has not yet committed its results. Accordingly, the readset 408 for the inner transaction 404 is not modified to indicate the read of location C, due to the branching of control to block 210 from block 204 based on a "true" evaluation.

Thus, in the context of closed nested transactions, a separate readset 406, 408 is maintained for each transaction 402, 404 in the nest that has not yet committed its results. For such embodiment, the readset 408 for an inner transaction 404 indicates all locations read by the current transaction that have not been read or written by an outer transaction. When an inner transaction 404 commits, the contents of its readset 408 are added to that of the immediate enclosing transaction 402. If, on the other hand, an inner transaction 404 is rolled back instead of committed, then the contents of its readset 408 are discarded.

It should be noted that on rollback of the inner transaction the metadata is either cleared or some other mechanism is utilized to distinguish the inner transaction's metadata from the outer transaction's metadata. On commit of the inner transaction, the inner transaction's metadata may be merged with that of the outer transaction so that the outer transaction can continue to filter reads that are redundant with respect to the inner transaction's reads.

Block 206 of FIG. 2 indicates that read barrier processing is performed if the evaluation at block 204 indicates that the metadata for the desired read address is not set. For closed nested transactions, it is assumed that neither the current transaction (e.g., inner transaction 404), nor any enclosing transactions in the nest (e.g., outer transaction 402), has read or written the desired read address if block 204 evaluates to "false". In such case, the read barrier processing at block 206 includes setting the metadata for the desired read location and recording the read location in the current transaction's (e.g., 404) readset (e.g., 408). An example of such read barrier processing is illustrated at operation 416b of FIG. 4, in response to the inner transaction' read 416a of memory location F, which has not been previously read nor written by any transaction 402, 404 in the nest.

Figure 5:
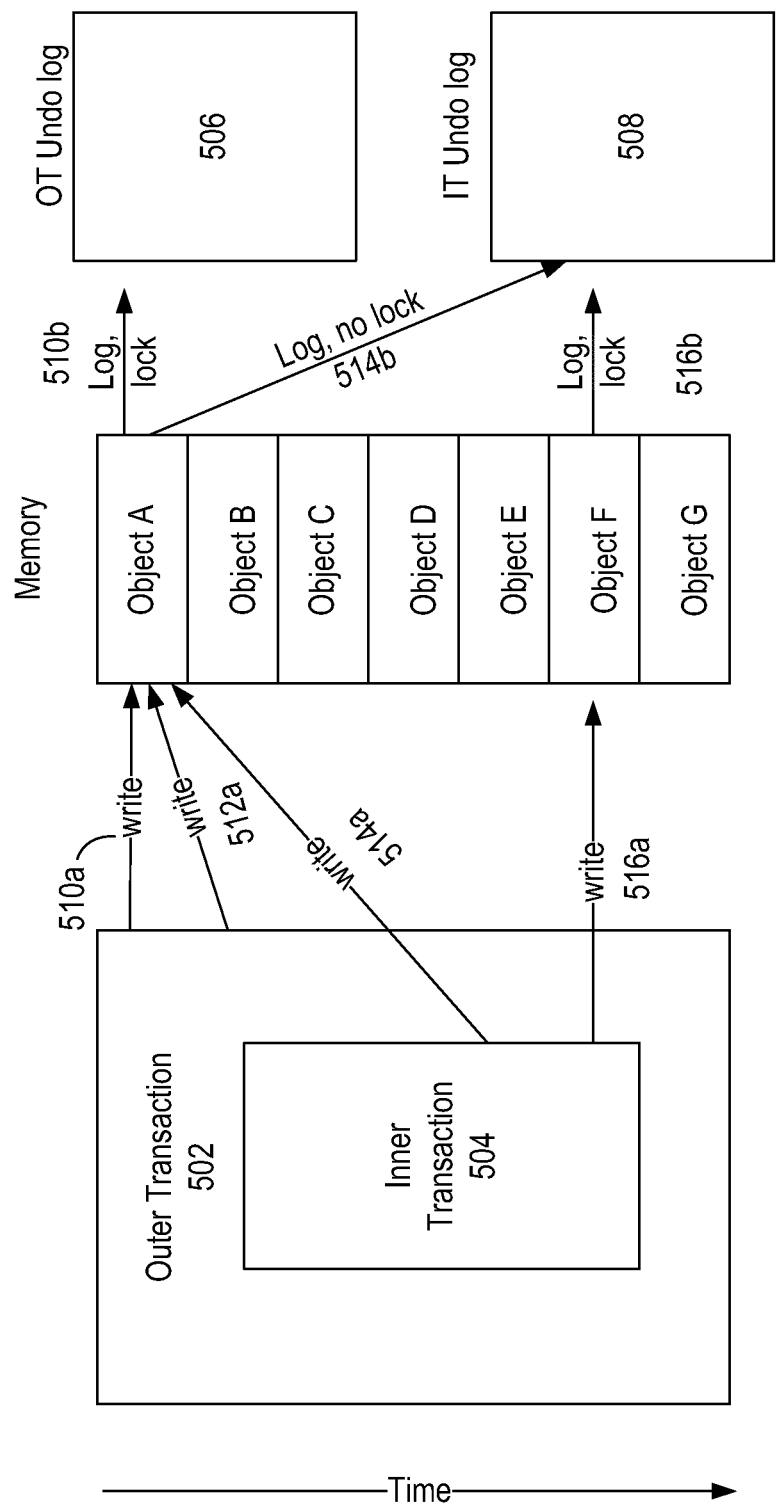
FIG. 5 is a block diagram illustrating at least one embodiment of example write operation processing for example closed nested transactions.

FIG. 5 illustrates at least one embodiment of filtering of write barrier processing for a closed nested transaction in an object-based system. Object-based systems further aggregate memory locations into objects. For such a system, object-level processing is performed such that before an object is modified, it is opened-for-writing.

The sample embodiment depicted in FIG. 5 illustrates an object-based system that follows an in-place update (eager versioning) scheme. As with FIG. 4, FIG. 5 illustrates a first atomic transaction 502, referred to as an "outer" transaction, which includes in the body of its code a second atomic transaction, 504. The second transaction 504 is referred to herein as an "inner" transaction. The inner 504 and outer 502 transactions have the same properties as those discussed above in connection with 404 and 402, respectively, of FIG. 4.

Because it illustrates a system that utilizes eager versioning, FIG. 5 includes undo logs 506, 508. The undo logs 406, 408 track all objects that have been modified (e.g., written) by the respective transaction 502, 504 and records the value of the memory location as it was before the transaction began execution. In the context of nested transactions, the undo log is maintained for each transaction in the nest that has not yet committed its results. Thus, FIG. 5 illustrates an undo log 506 for outer transaction 502 and an undo log 508 for inner transaction 504.

FIG. 5 illustrates that write barrier filtering for nested transactions is similar in some ways to the read barrier filtering described above, but that there are additional considerations for write barrier processing. As with read barrier filtering, it is unnecessary to open an object for writing (e.g., set the write metadata and acquire a lock) in an inner transaction if an outer transaction has already written the same address. However, an undo log is kept for any memory locations that have been written by the inner transaction, even if they were also previously written by the outer transaction.

FIG. 5 illustrates that for a write by the outer transaction 502 to memory object A at operation 510a, the current contents of object A are first recorded in the undo log 506 at operation 510b. The log processing 510b roughly corresponds to block 108 of FIG. 1. Additional write barrier processing may be performed for the write operation 510 of FIG. 5, including lock acquisition (see, e.g., block 106 of FIG. 1) and setting the metadata for object A to indicate that the current (outer) transaction 502 has written to the memory location (see, e.g., block 110 of FIG. 1).

FIG. 5 illustrates that, upon a second write 512a to the same memory location by the same (outer) transaction 502, no logging is performed. The filtering (that is, elimination) of the lock acquisition, undo logging, and metadata modification operations (see blocks 106, 108, and 110, respectively, of FIG. 1) is represented in FIG. 5 by the absence of write barrier processing (that is, FIG. 5 does not include a log operation (512b)).

FIG. 5 illustrates that, for a subsequent write by the inner transaction 504 to a memory object A, the current value of the memory location is logged in the undo log 508 for the inner transaction. However, because the outer transaction 502 has already locked the object (e.g., block 106 of FIG. 1 has been performed at operation 510b of FIG. 5), lock acquisition need not be performed at operation 514b. Accordingly, FIG. 5 illustrates that lock acquisition may be filtered (not executed) for a subsequent write by an inner transaction. Such filtering is indicated in FIG. 5 by the "no lock" nomenclature for operation 514b.

Thus, FIG. 5 illustrates that lock acquisition, undo logging, and metadata write barrier operations may be filtered out for a subsequent write (e.g., 512a) to an object or address when the same transaction (e.g., 502) has already written the same address or object (see, e.g., write operation 510a). However, such comprehensive filtering is not applied for subsequent writes to the same object by an inner transaction (see, e.g., write operation 514a performed by inner transaction 504). In such case, only the locking is filtered out.

It will be noted that the manipulating of metadata is not filtered out for write operation 514a in an object-based system. That is, regardless of whether metadata indicates that the object has been written by an uncommitted outer transaction (e.g., 502), the metadata for object of the write operation of the inner transaction (e.g., 514a) is manipulated at operation 514b. For at least one embodiment, such metadata manipulation is implemented in the open-for-write action. For such embodiment(s), when an object is opened for writing, the metadata for the desired write location is evaluated.

Figure 6:
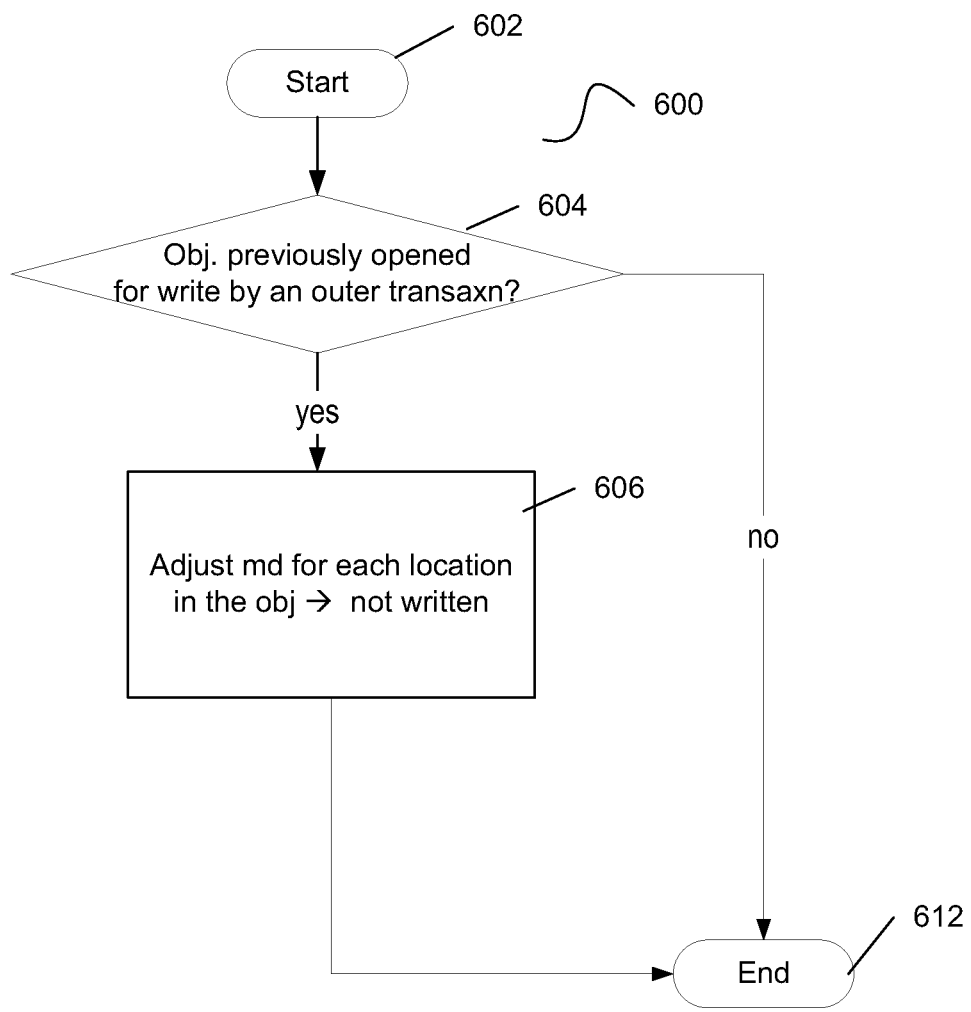
FIG. 6 is a flowchart illustrating at least one embodiment of method for metadata manipulation for write processing for nested transactions in an object-based system.

Turning briefly to FIG. 6, shown is a flowchart of at least one embodiment of a method 600 for metadata manipulation for write processing for nested transactions in an object-based system. For at least one embodiment, the method 600 is performed during open-for-write processing. For purposes of explanation, it is assumed for the instant discussion that the method 600 is performed during open-for-write processing associated with a write to an object by an inner transaction, such as processing 514b associated with write operation 514a by inner transaction 504 as illustrated in FIG. 5. FIGS. 5 and 6 are consulted together in the following discussion.

FIG. 6 illustrates that processing for the method 600 begins at block 602 and proceeds to block 604. At block 604, it is determined whether the desired write object has been previously opened by an outer transaction. For the example illustrated in FIG. 5, at the time of read operation 514a, object A has already been previously opened for writing by outer transaction 502 at operation 510b. For such example, the evaluation at block 604 evaluates to "true". In such case, processing proceeds to block 606. Otherwise processing ends at block 612.

For the case that the evaluation at block 604 evaluates to false and proceeds to block 612, it could be the case that the object has previously been opened for reading by the outer transaction. In such case, the metadata encoding for the object is retained.

At block 606, since the object has previously been opened by an outer transaction, then the metadata encoding for each location in the object is adjusted to indicate that the location has not been written. In this manner, the first time that a location is modified by an inner transaction, the method 600 sets the metadata for the location to indicate that it has been modified by the inner transaction. This metadata manipulation method 600 may be performed in addition to other processing discussed above, such as recording the current value for the object in the undo log 508 for the inner transaction 504. From block 606, processing ends at block 612. Accordingly, the write barrier processing and filtering discussed above for closed nested transactions may be generally characterized by the pseudocode in Table 4. While the illustrated pseudocode is directed toward an object-based transactional memory system, one of skill in the art will recognize that the code may be easily modified for address-based systems.

TABLE 4

Pseudocode for write barrier for closed nested transactions

| | |
|---|---|
| 1. | rc = open-for-writing(M) |
| 2. | if (rc == held__by__outer)) { |
| 3. | for each location X in object (M) |
| 4. | clear__metadata(X)); |
| 5. | } |
| 6. | if (!metadat__written(M)) { |
| 7. | create undo entry for M in undo log |
| 8. | set__write__metadata(M) |
| 9. | } |
| 10. | } |

For closed nested transactions, when the inner transaction 504 is committed, any new undo log 506 information recorded for the inner transaction is combined with the undo log 508 of the outer transaction 502. No changes are made to the metadata information in this case.

However, execution of the inner transaction 504 is separately managed for the purposes of all-or-nothing atomic execution. Should a data conflict arise between the execution of the inner transaction 504 and some other thread, or should the inner transaction 504 throw an exception that will be caught inside of the outer transaction 502, then the side effects of the inner transaction 504 are rolled back (that is, they are undone), and any locks acquired during execution of the inner transaction 504 are released.

When an inner transaction (e.g., 504) is rolled back (that is, it cannot commit but is instead aborted), its undo log (e.g., 508) is used to restore the values of the memory locations that were modified by the transaction 504 to the state before the transaction execution was begun.

Also, for rollback of an inner transaction the readset (e.g., 408 of FIG. 4) and undo log (e.g., 508 of FIG. 5) for the inner transaction are traversed, and the metadata for any mentioned object or location is restored to a metadata encoding that implies that neither read nor write access has been performed by the inner transaction. After the values of the memory locations are restored using the contents of the undo log for a roll-back operation, and the contents for the readset and undo log have been traversed to restore metadata values, the contents of the undo log are discarded. The processing for the metadata restoration for a rollback of an inner transaction is generally described by the pseudocode set forth in Table 5, below.

When a top level transaction (such as outer transaction 402 of FIG. 4; 502 of FIG. 5) commits or rolls back, the read set (e.g., 406 of FIG. 4) and undo log (e.g., 506 of FIG. 5) for the transaction are traversed and the metadata for each accessed location is cleared to imply that neither read nor write access has been performed. In this manner, the metadata for memory locations or objects accessed during a transaction (and all child transactions in its nest) are reinitialized to an initial value. If the particular embodiment of the transactional memory system provides a more efficient manner to perform a bulk initialization, without traversing the readset and undo log, such mechanism may be used to re-initialize metadata after roll-back and commit operations for an outer transaction. The processing for clearing metadata upon commit of a top-level transaction is generally described by the pseudocode in Table 5:

TABLE 5

Pseudocode for top-level commit and metadata processing for inner abort

1. For each location in readset
2.    clear_metadata(M);
3. For each location in undo log
4.    clear_metadata(M);
5. discard readset;
6. discard undo log;

For at least one embodiment of a multi-context metadata filtering system, the metadata for each memory location or object is organized into separately identifiable contexts which can be encoded as simple non-negative integers. In such a system, if a new context is associated with the inner transaction, then it will be isolated from the metadata information of its parent. In this case the basic filtering may be implemented as described above but with one or more of the following modifications:

1. No special action need be taken by the open-for-writing.
2. When an inner transaction commits, we traverse its undo log and set the metadata state for each location for the parent context to indicate that the data has been written. Similarly we traverse the readset and set the metadata state for each location for the parent context to indicate the data has been read.
3. In both cases, each location accessed has its metadata for the child context reset to indicate no access so that context may be reused. If the system provides a mechanism to clear all the metadata associated with a context and accessed by the transaction it may be used for this purpose.
4. When an inner transaction is rolled back, we clear the metadata for its associated context is in the simple metadata filtering approach described above.

Steps 1 and 2 are optional and may be omitted if it is determined that the cost of updating the parent context is greater than the redundant monitoring actions that may happen.

Yet another alternative embodiment (the first alternative being the maintenance of separate contexts for each transaction in the nest) is to maintain separate contexts for read operations and write operations. When an inner transaction is started, such alternative system may allocate a new context for the write operations but retain the same context for all read operations. The processing proceeds for filtering read and write monitoring actions as described above for the multi-context metadata filtering in alternative embodiment. The primary difference is that when an inner transaction commits, there is no need to traverse its readset to update the parent. Table 6 illustrates pseudocode that generally describes the operation associated with multi-context metadata filtering assuming separate read and write contexts.

TABLE 6 multi-context metadata filtering assuming separate read and write contexts

| | |
|---|---|
| start a transaction | create new readset and undo log<br>allocate new write context WC<br>if(top-level) allocate a new read context RC |
| commit a top-level transaction | for each location M in readset do<br>   clear_metadata (RC, M)<br>for each location M in undo log do<br>   clear_metadata(WC, M)<br>discard readset and undo log<br>release RC and WC |

TABLE 6-continued multi-context metadata filtering assuming separate read and write contexts

| | |
|---|---|
| commit inner transaction | for each location M in undo log do<br>   clear_metadata(WC, M)<br>   metadata_set_written(parent WC, M) // optional<br>combine readset with parent readset<br>combine undo log with parent undo log<br>reset WC to that of parent<br>release WC |
| rollback | for each location M in readset do<br>   clear_metadata_for(RC, M)<br>for each entry U in undo log do<br>   restore_original_value(U)<br>   clear_metadata<br>discard readset and undo log<br>release WC<br>if(top-level) release RC<br>else reset WC to that of parent |
| read location M | if(! metadata_read(RC,M) and<br>    !metadata_written(WC,M)) {<br>   open-for-reading(M);<br>   add M to readset<br>   metadata_set_read(M)<br>} |
| write location M | if(!metadata_written(WC,M)) {<br>   open-for-writing(M)<br>   create undo entry for M<br>   metadata_set_written(WC,M)<br>} |

It should be noted that metadata-based filtering and the techniques described above to support nested transactions apply even for embodiments that allow hardware metadata to spontaneously re-set to an initialization value. That is, some systems may allow the metadata data to be arbitrarily reset to a state indicating no access has been made at any point during a transaction. Note various optimizations to the basic system used to avoid redundant monitoring of memory accesses and redundant object-level operations may still be applied when metadata filtering is used.

Read Barrier Processing for Strong Atomicity.

Transactional memory systems that provides weak atomicity isolate transactions only from other transactions. Software implementation of weak atomicity may insert barriers only into the transactional code. Transactional memory that provides strong atomicity isolates transactions from both transactional and non-transactional code. Software implementation of strong atomicity typically involves insertion of barriers into both transactional and non-transactional code. That is, enforcement of memory ordering and isolation between transactional and non-transactional instruction streams involves insertion of read and write isolation barriers in code that executes outside of atomic blocks. Accordingly, read isolation barriers may be inserted by the compiler into non-transactional code. These barriers serialize non-transactional reads with atomic blocks.

On a system that includes hardware metadata and hardware read monitoring, a software transactional memory system may utilize the metadata and read monitor information to accelerate read barrier processing.

As is described above in connection with FIG. 3, the read monitoring feature is a hardware feature of the underlying hardware of the transactional memory system that caches data close to one processor, but still makes it available to all processors in a globally coherent manner. Blocks of memory may be identified by a logical processor as read monitored. If another processor or thread writes to any location in a read monitored block, then the read monitoring attribute is removed. As long as read monitoring has not been lost, no other processor has made a conflicting access to the data items.

Figure 7:
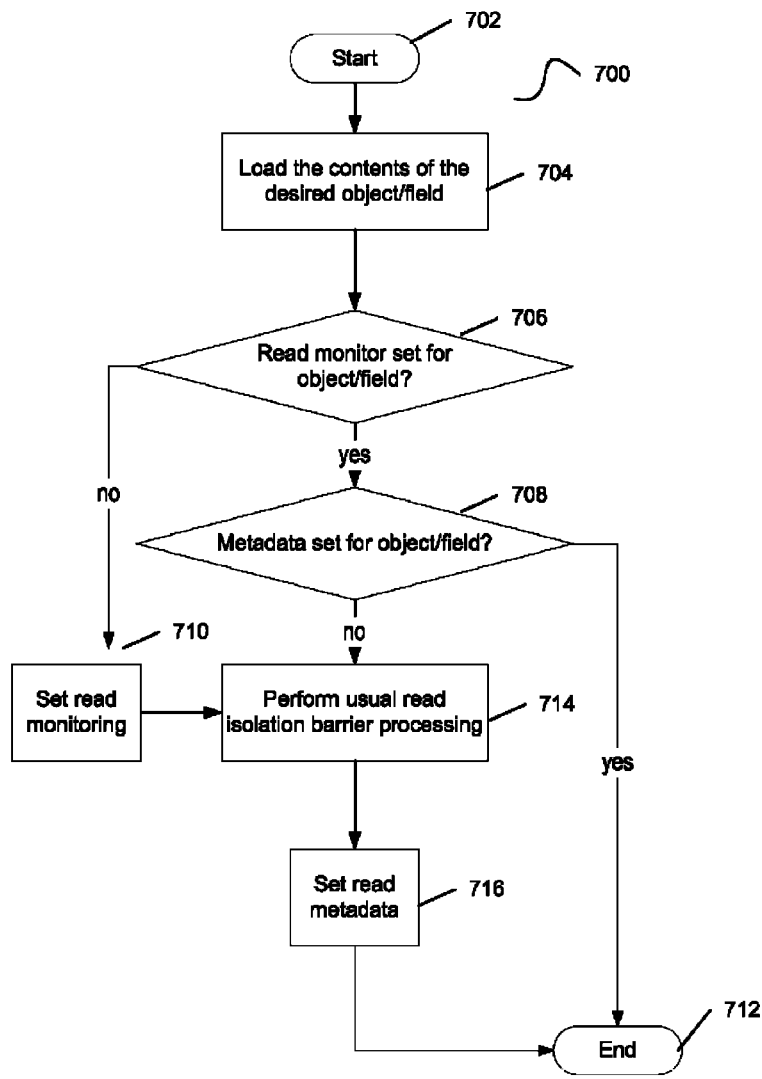
FIG. 7 is a flowchart illustrating at least one embodiment of a method for using the read monitoring feature, along with hardware metadata, to filter out unnecessary read isolation barrier processing for strong atomicity.

FIG. 7 illustrates at least one embodiment of a method 700 for using the read monitoring feature, along with the hardware metadata, to filter out unnecessary read isolation barrier processing. Code for the method 700 may be inserted into non-transactional code by the compiler when it encounters a read operation such as: t=obj.field in an object-based system.

FIG. 7 illustrates that processing for the method begins at block 702 and proceeds to block 704. At block 704, the desired contents (e.g., the contents of field "field" of object "obj") are loaded. Processing the proceeds to block 706.

At block 706, an evaluation is made to determine whether the read monitor is set for the desired data. If so, processing proceeds to block 708. At block 708, an evaluation is made to determine whether the metadata for the desired data indicates that a read has previously been performed by the current transaction.

If both conditions are true (that is, if both the read monitor and the read metadata bits for the desired data are set), then it is assumed that the desired data was previously read by the current transaction and it has not been updated by any other agent since that previous read. In such case, no isolation barrier processing need be performed, and processing ends at block 712.

If, on the other hand, the evaluation at block 706 evaluates to false, then processing proceeds to block 710. At block 710, the read monitor for the desired data object (or field) is set. This will action will initiate read monitoring for updates to the desired data by other agents. For at least one embodiment, the processing at block 710 also includes additional metadata processing. That is, if the method 700 detects at bock 710 that the read monitor for the desired data is not set, it may be assumed that any other object in that cache line may also be invalid due to writes from another agent. Thus, the processing at block 710 may also include clearing the hardware metadata associated with the read-monitored cache line. From block 710, processing then proceeds to block 714, wherein normal software read isolation barrier processing is performed.

From block 714, processing proceeds to block 716. At block 716, the metadata is set to indicate that the current transaction has read the object (or field). The result of the processing at blocks 708 (if performed) along with blocks 714 and 716 is that, as long as no other agent updates the object (or field) during a transaction, and neither the cache line containing the metadata word nor the metadata are lost, then future accesses to the object (field) will skip the relatively expensive read isolation barrier processing at block 714 (see "yes" processing from block 708 to bock 712). Processing then ends at block 712.

If it is the case that read monitoring is true (see, e.g., block 706), but the read metadata is not set for the desired object or field (see, e.g., block 708), processing proceeds to block 714, where normal read barrier processing is performed. Processing then proceeds from block 714 to 716, where the read metadata bit for the desired object or field is set. Processing then ends at block 712.

The read isolation barrier processing and filtering discussed above may be generally characterized by the pseudocode in Table 7.

TABLE 7

| Pseudocode for read isolation barrier filtering | |
| --- | --- |
| mov t, [&obj.f] | ; load the field |
| testMonitor.8.rm [&obj.tmw] | ; test read monitor |
| jc nomonitor | |
| cmdt[0].8 [&obj.tmw] | ; test metadata |
| jnz done | |
| jmp readBarrierLabel | |
| nomonitor: | |
| cmdclr[0].8 [&obj.tmw] | ; compressed metadata clear |
| setMonitor.8.rm [&obj.tmw] | ; set read monitor |
| readBarrierLabel: | |
| t = txnRead<type>Isolated(obj,f) | ; perform the read |
| cmds[0].8 [&obj.tmw] | ; compressed metadata store |
| done: | |
| ... | |

While embodiments of the method 700 illustrated in FIG. 7 are described above in terms of a metadata-based embodiment, other embodiments are also encompassed by the appended claims. For example, for an alternative embodiment the use of metadata in the above discussion may be replaced by ephemeral (buffered) stores for embodiments that provide buffered stores in the underlying architecture.

Underlying Hardware: Metadata

Figure 8:
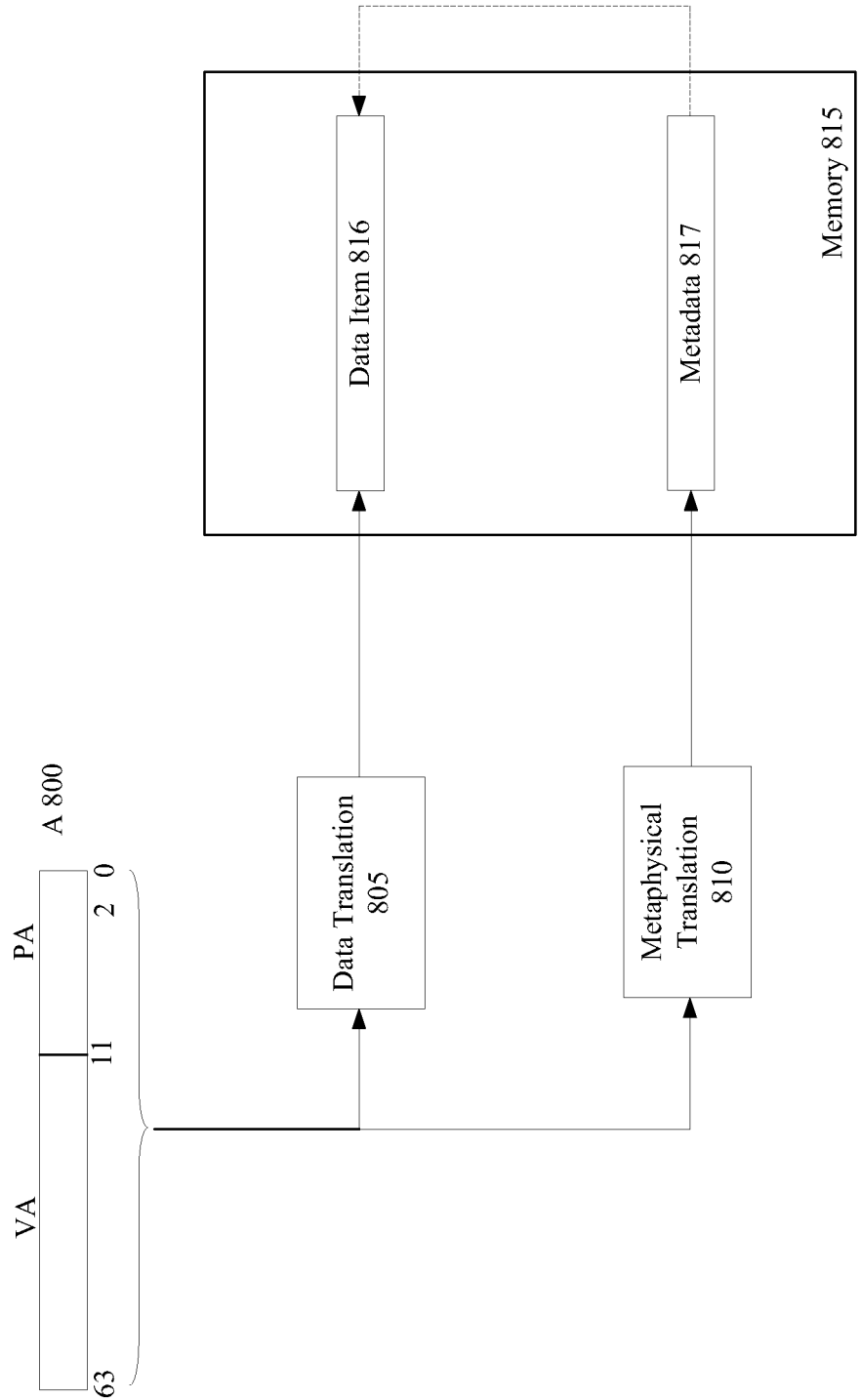
FIG. 8 illustrates at least one embodiment of a hardware mechanism to associate metadata with a data item.

Turning to FIG. 8, an embodiment of holding metadata for a data item in a processor is illustrated. As depicted, metadata 817 for data item 816 is held locally in memory 815. Metadata includes any property or attribute associated with data item 816, such as transactional information relating to data item 816. Some illustrative examples of metadata are included below; yet the disclosed examples of metadata are purely illustrative and do not included an exhaustive list. In addition, metadata location 817 may hold any combination of the examples discussed below and other attributes for data item 816, which are not specifically discussed.

As a first example, metadata 817 includes a reference to a backup or buffer location for transactionally written data item 816, if data item 816 has been previously accessed, buffered and/or backed up within a transaction. Here, in some implementations a backup copy of a previous version of data item 816 is held in a different location, and as a result, metadata 817 includes an address, or other reference, to the backup location. Alternatively, metadata 817 itself may act as a backup or buffer location for data item 816.

As another example, metadata 817 includes a filter value to accelerate repeat transactional accesses to data item 816. Often, during execution of a transaction utilizing software, access barriers are performed at transactional memory accesses to ensure consistency and data validity. For example, before a transactional load operation a read barrier is executed to perform read barrier operations, such testing if data item 816 is unlocked, determining if a current read set of the transaction is still valid, updating a filter value, and logging of version values in the read set for the transaction to enable later validation. However, if a read of that location has already been performed during execution of the transaction, then the same read barrier operations are potentially unnecessary.

As a result, one solution includes utilizing a read filter to hold a first default value to indicate data item 816, or the address therefore, has not been read during execution of the transaction and a second accessed value to indicate that data item 816, or the address therefore, has already been accessed during a pendency of the transaction. Essentially, the second accessed value indicates whether the read barrier should be accelerated. In this instance, if a transactional load operation is received and the read filter value in metadata location 817 indicates that data item 816 has already been read, then, in one embodiment, the read barrier is elided—not executed—to accelerate the transactional execution by not performing unnecessary, redundant read barrier operations. Note that a write filter value may operate in the same manner with regard to write operations. However, individual filter values are purely illustrative, as, in one embodiment, a single filter value is utilized to indicate if an address has already been accessed—whether written or read. Here, metadata access operations to check metadata 817 for 816 for both loads and stores utilize the single filter value, which is in contrast to the examples above where metadata 817 includes a separate read filter value and write filter value. As a specific illustrative embodiment, four bits of metadata 817 are allocated to a read filter to indicate if a read barrier is to be accelerated in regards to an associated data item, a write filter to indicate if a write barrier is to be accelerated in regards to an associated data item, an undo filter to indicate undo operations are to be accelerated, and a miscellaneous filter to be utilized in any manner by software as a filter value.

A few other examples of metadata include an indication of, representation of, or a reference to an address for a handler—either generic or specific to a transaction associated with data item 816, an irrevocable/obstinate nature of a transaction associated with data item 816, a loss of data item 816, a loss of monitoring information for data item 816, a conflict being detected for data item 816, an address of a read set or read entry within a read set associated with data item 816, a previous logged version for data item 816, a current version of data item 816, a lock for allowing access to data item 816, a version value for data item 816, a transaction descriptor for the transaction associated with data item 816, and other known transaction related descriptive information. Furthermore, as described above, use of metadata is not limited to transactional information. As a corollary, metadata 817 may also include information, properties, attributes, or states associated with data item 816, which are not involved with a transaction.

Continuing the discussion of illustrations for metadata, the hardware monitors and buffered coherency states described above are also considered metadata in some embodiments. The monitors indicate whether a location is to be monitored for external read requests or external read for ownership requests, while the buffered coherency state indicates if an associated data cache line holding a data item is buffered. Yet, in the examples above, monitors are maintained as attribute bits, which are appended to or otherwise directly associated with cache lines, while the buffered coherency state is added to cache line coherency state bits. As a result, in that case, hardware monitors and buffered coherency states are part of the cache line structure, not held in a separate metaphysical address space, such as illustrated metadata 817. However, in other embodiments monitors may be held as metadata 817 in a separate memory location from data item 816, and similarly, metadata 817 may included a reference to indicate that data item 816 is a buffered data item. Conversely, instead of an update-in-place architecture, where data item 816 is updated and held in a buffered state as described above, metadata 817 may hold the buffered data item, while the globally visible version of data item 816 is maintained in its original location. Here, upon commit the buffered update held in metadata 817 replaces data item 816.

Lossy Metadata

Similar to the discussion above with reference to buffered cache coherency states, metadata 817, in one embodiment, is lossy—local information that is not provided to external requests outside memory 815's domain. Assuming for one embodiment that memory 815 is a shared cache memory, then a miss in response to a metadata access operation is not serviced outside cache memory 815's domain. Essentially, since lossy metadata 817 is only held locally within the cache domain and does not exist as persistent data throughout the memory subsystem, there is no reason to forward the miss externally to service the request from a higher-level memory. As a result, misses to lossy metadata are potentially serviced in a quick and efficient fashion; immediate allocation of memory in the processor may be allocated without waiting for an external request for the metadata to be generated or serviced.

Metaphysical Address Space

As the illustrated embodiment depicts, metadata 817 is held in a separate memory location—a distinct address—from data item 816, which results in a separate metaphysical address space for metadata; the metaphysical address space being orthogonal to the data address space—a metadata access operations to the metaphysical address space does not hit or modify a physical data entry. However, in the embodiment where metadata is held within the same memory, such as memory 815, the metaphysical address space potentially affects the data address space through competition for allocation in memory 815. As an example, a data item 816 is cached in an entry of memory 815, while metadata 817 for data 816 is held in another entry of the cache. Here, a subsequent metadata operation may result in the selection of data item 816's memory location for eviction and replacement with metadata for a different data item. As a result, operations associated with metadata 817's address do not hit data item 816, however, a metadata address for a metadata element may replace physical data, such as data item 816 within memory 815.

Even though, in this example, metadata potentially competes with data for space in the cache memory, the ability to hold metadata locally potentially results in efficient support for metadata without expensive cost of proliferating persistent metadata throughout a memory hierarchy. As inferred by the assumption of this example—that metadata is held in the same memory, memory 815; however, in an alternative embodiment, metadata 817 for/associated with data item 816 is held in a separate memory structure. Here, addresses for metadata and data may be the same, while a metaphysical portion of the metadata address indexes into the separate metadata storage structure instead of the data storage structure.

In a one-to-one ratio of metadata to data, a metaphysical address space shadows the data address space, but remains orthogonal as discussed above. In contrast, for one or more alternative embodiments, metadata may be compressed with regard to physical data. In this case, the size of a metaphysical address space for metadata does not shadow the data address space in size, but still remains orthogonal.

Figure 9:
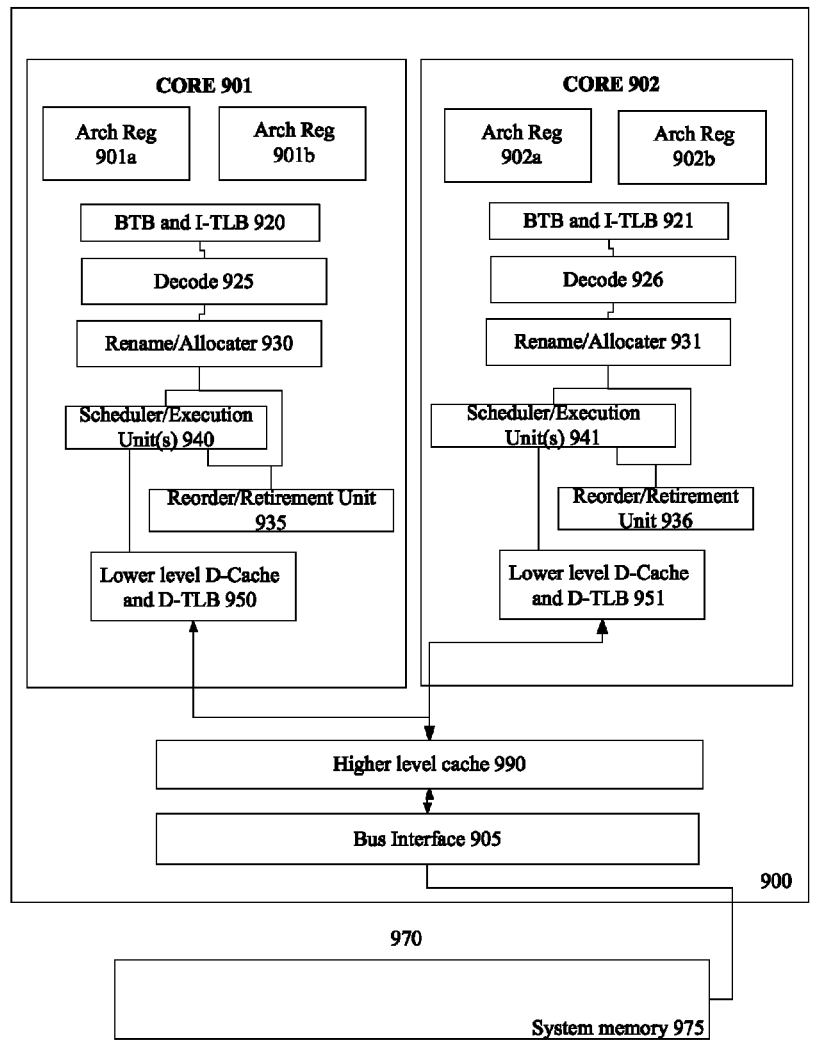
FIG. 9 is a block diagram illustrating at least one embodiment of a processor including multiple processing elements capable of executing multiple software threads concurrently.

Referring to FIG. 9, an embodiment of a processor capable of executing multiple threads concurrently is illustrated. Note, processor 900 may include hardware support for hardware transactional execution. Either in conjunction with hardware transactional execution, or separately, processor 900 may also provide hardware support for hardware acceleration of a Software Transactional Memory (STM), separate execution of a S™, or a combination thereof, such as a hybrid Transactional Memory (TM) system. Processor 900 includes any processor, such as a micro-processor, an embedded processor, a digital signal processor (DSP), a network processor, or other device to execute code. Processor 900, as illustrated, includes a plurality of processing elements.

In one embodiment, a processing element refers to a thread unit, a process unit, a context, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state wherein each independently maintained architectural state is associated with at least some dedicated execution resources. In contrast to cores, a hardware thread typically refers to any logic located on an integrated circuit capable of maintaining an independent architectural state wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 900, as illustrated in FIG. 9, includes two cores, core 901 and 902, which share access to higher level cache 990. Although processor 900 may include asymmetric cores, i.e. cores with different configurations, functional units, and/or logic, symmetric cores are illustrated. As a result, core 902, which is illustrated as identical to core 901, will not be discussed in detail to avoid repetitive discussion. In addition, core 901 includes two hardware threads 901a and 901b, while core 902 includes two hardware threads 902a and 902b. Therefore, software entities, such as an operating system, potentially view processor 900 as four separate processors, i.e. four logical processors or processing elements capable of executing four software threads concurrently.

Here, a first thread is associated with architecture state registers 901a, a second thread is associated with architecture state registers 901b, a third thread is associated with architecture state registers 902a, and a fourth thread is associated with architecture state registers 902b. As illustrated, architecture state registers 901a are replicated in architecture state registers 901b, so individual architecture states/contexts are capable of being stored for logical processor 901a and logical processor 901b. Other smaller resources, such as instruction pointers and renaming logic in rename allocator logic 930 may also be replicated for threads 901a and 901b. Some resources, such as reorder buffers in reorder/retirement unit 935, ILTB 920, load/store buffers, and queues may be shared through partitioning. Other resources, such as general purpose internal registers, page-table base register, low-level data-cache and data-TLB 995, execution unit(s) 940, and portions of out-of-order unit 935 are potentially fully shared.

Processor 900 often includes other resources, which may be fully shared, shared through partitioning, or dedicated by/to processing elements. In FIG. 1, an embodiment of a purely exemplary processor with illustrative functional units/resources of a processor is illustrated. Note that a processor may include, or omit, any of these functional units, as well as include any other known functional units, logic, or firmware not depicted.

As illustrated, processor 900 includes bus interface module 905 to communicate with devices external to processor 900, such as system memory 975, a chipset, a northbridge, or other integrated circuit. Memory 975 may be dedicated to processor 900 or shared with other devices in a system. Higher-level or further-out cache 990 is to cache recently fetched elements from higher-level cache 990. Note that higher-level or further-out refers to cache levels increasing or getting further way from the execution unit(s). In one embodiment, higher-level cache 990 is a second-level data cache. However, higher level cache 990 is not so limited, as it may be associated with or include an instruction cache. A trace cache, i.e. a type of instruction cache, may instead be coupled after decoder 925 to store recently decoded traces. Module 920 also potentially includes a branch target buffer to predict branches to be executed/taken and an instruction-translation buffer (I-TLB) to store address translation entries for instructions.

Decode module 925 is coupled to fetch unit 920 to decode fetched elements. In one embodiment, processor 900 is associated with an Instruction Set Architecture (ISA), which defines/specifies instructions executable on processor 900. Here, often machine code instructions recognized by the ISA include a portion of the instruction referred to as an opcode, which references/specifies an instruction or operation to be performed.

In one example, allocator and renamer block 930 includes an allocator to reserve resources, such as register files to store instruction processing results. However, threads 901a and 901b are potentially capable of out-of-order execution, where allocator and renamer block 930 also reserves other resources, such as reorder buffers to track instruction results. Unit 930 may also include a register renamer to rename program/instruction reference registers to other registers internal to processor 900. Reorder/retirement unit 935 includes components, such as the reorder buffers mentioned above, load buffers, and store buffers, to support out-of-order execution and later in-order retirement of instructions executed out-of-order.

Scheduler and execution unit(s) block 940, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 950 are coupled to execution unit(s) 940. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

In one embodiment, processor 900 is capable of hardware transactional execution, software transactional execution, or a combination or hybrid thereof. A transaction, which may also be referred to as a critical or atomic section of code, includes a grouping of instructions, operations, or micro-operations to be executed as an atomic group. For example, instructions or operations may be used to demarcate a transaction or a critical section. In one embodiment, described in more detail below, these instructions are part of a set of instructions, such as an Instruction Set Architecture (ISA), which are recognizable by hardware of processor 900, such as decoders described above. Often, these instructions, once compiled from a high-level language to hardware recognizable assembly langue include operation codes (opcodes), or other portions of the instructions, that decoders recognize during a decode stage.

Typically, during execution of a transaction, updates to memory are not made globally visible until the transaction is committed. As an example, a transactional write to a location is potentially visible to a local thread, yet, in response to a read from another thread the write data is not forwarded until the transaction including the transactional write is committed. While the transaction is still pending, data items/elements loaded from and written to within a memory are tracked, as discussed in more detail below. Once the transaction reaches a commit point, if conflicts have not been detected for the transaction, then the transaction is committed and updates made during the transaction are made globally visible.

However, if the transaction is invalidated during its pendency, the transaction is aborted and potentially restarted without making the updates globally visible. As a result, pendency of a transaction, as used herein, refers to a transaction that has begun execution and has not been committed or aborted, i.e. pending.

A Software Transactional Memory (STM) system often refers to performing access tracking, conflict resolution, or other transactional memory tasks within or at least partially within software. In one embodiment, processor 900 is capable of executing a compiler to compile program code to support transactional execution. Here, the compiler may insert operations, calls, functions, and other code to enable execution of transactions.

A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle end, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts transactional operations, calls, functions, etc. in one or more phases of compilation, such as insertion of calls/operations in a front-end phase of compilation and then transformation of the calls/operations into lower-level code during a transactional memory transformation phase.

Nevertheless, despite the execution environment and dynamic or static nature of a compiler, the compiler, in one embodiment, compiles program code to enable transactional execution. Therefore, reference to execution of program code, in one embodiment, refers to (1) execution of a compiler program(s), either dynamically or statically, to compile main program code, to maintain transactional structures, or to perform other transaction related operations, (2) execution of main program code including transactional operations/calls, (3) execution of other program code, such as libraries, associated with the main program code, or (4) a combination thereof.

Often within software transactional memory (STM) systems, a compiler will be utilized to insert some operations, calls, and other code inline with application code to be compiled, while other operations, calls, functions, and code are provided separately within libraries. This potentially provides the ability of the libraries distributors to optimize and update the libraries without having to recompile the application code. As a specific example, a call to a commit function may be inserted inline within application code at a commit point of a transaction, while the commit function is separately provided in an updateable library. Additionally, the choice of where to place specific operations and calls potentially affects the efficiency of application code. For example, if a filter operation, is inserted inline with code, the filter operation may be performed before vectoring execution to a barrier instead of inefficiently vectoring to the barrier and then performing the filter operation.

In one embodiment, processor 900 is capable of executing transactions utilizing hardware/logic, i.e. within a Hardware Transactional Memory (HTM) system. Numerous specific implementation details exist both from an architectural and microarchitectural perspective when implementing an HTM; most of which are not discussed herein to avoid unnecessarily obscuring the invention. However, some structures and implementations are disclosed for illustrative purposes. Yet, it should be noted that these structures and implementations are not required and may be augmented and/or replaced with other structures having different implementation details.

As a combination, processor 900 may be capable of executing transactions within an unbounded transactional memory (UTM) system, which attempts to take advantage of the benefits of both STM and HTM systems. For example, an HTM is often fast and efficient for executing small transactions, because it does not rely on software to perform all of the access tracking, conflict detection, validation, and commit for transactions. However, HTMs are usually only able to handle smaller transactions, while STMs are able to handle unbounded sized transactions. Therefore, in one embodiment, a UTM system utilizes hardware to execute smaller transactions and software to execute transactions that are too big for the hardware. As can be seen from the discussion below, even when software is handling transactions, hardware may be utilized to assist and accelerate the software. Furthermore, it is important to note that the same hardware may also be utilized to support and accelerate a pure STM system.

As stated above, transactions include transactional memory accesses to data items both by local processing elements within processor 900, as well as potentially by other processing elements. Without safety mechanisms in a transactional memory system, some of these accesses would potentially result in invalid data and execution, i.e. a write to data invalidating a read, or a read of invalid data. As a result, processor 900 potentially includes logic to track or monitor memory accesses to and from data items for identification of potential conflicts, such as read monitors and write monitors, as discussed below.

A data item or data element may include data at any granularity level, as defined by hardware, software or a combination thereof. A non-exhaustive list of examples of data, data elements, data items, or references thereto, include a memory address, a data object, a class, a field of a type of dynamic language code, a type of dynamic language code, a variable, an operand, a data structure, and an indirect reference to a memory address. However, any known grouping of data may be referred to as a data element or data item. A few of the examples above, such as a field of a type of dynamic language code and a type of dynamic language code refer to data structures of dynamic language code. To illustrate, dynamic language code, such as Java™ from Sun Microsystems, Inc, is a strongly typed language. Each variable has a type that is known at compile time. The types are divided in two categories—primitive types (Boolean and numeric, e.g., int, float) and reference types (classes, interfaces and arrays). The values of reference types are references to objects. In Java™, an object, which consists of fields, may be a class instance or an array. Given object a of class A it is customary to use the notation A::x to refer to the field x of type A and a.x to the field x of object a of class A. For example, an expression may be couched as a.x=a.y+a.z. Here, field y and field z are loaded to be added and the result is to be written to field x.

Therefore, monitoring/buffering memory accesses to data items may be performed at any of data level granularity. For example, in one embodiment, memory accesses to data are monitored at a type level. Here, a transactional write to a field A::x and a non-transactional load of field A::y may be monitored as accesses to the same data item, i.e. type A. In another embodiment, memory access monitoring/buffering is performed at a field level granularity. Here, a transactional write to A::x and a non-transactional load of A::y are not monitored as accesses to the same data item, as they are references to separate fields. Note, other data structures or programming techniques may be taken into account in tracking memory accesses to data items. As an example, assume that fields x and y of object of class A, i.e. A::x and A::y, point to objects of class B, are initialized to newly allocated objects, and are never written to after initialization. In one embodiment, a transactional write to a field B::z of an object pointed to by A::x are not monitored as memory access to the same data item in regards to a non-transactional load of field B::z of an object pointed to by A::y. Extrapolating from these examples, it is possible to determine that monitors may perform monitoring/buffering at any data granularity level.

In one embodiment, processor 900 includes monitors to detect or track accesses, and potential subsequent conflicts, associated with data items. As one example, hardware of processor 900 includes read monitors and write monitors to track loads and stores, which are determined to be monitored, accordingly. As an example, hardware read monitors and write monitors are to monitor data items at a granularity of the data items despite the granularity of underlying storage structures. In one embodiment, a data item is bounded by tracking mechanisms associated at the granularity of the storage structures to ensure the at least the entire data item is monitored appropriately.

As a specific illustrative example, read and write monitors include attributes associated with cache locations, such as locations within lower level data cache 950, to monitor loads from and stores to addresses associated with those locations. Here, a read attribute for a cache location of data cache 950 is set upon a read event to an address associated with the cache location to monitor for potential conflicting writes to the same address. In this case, write attributes operate in a similar manner for write events to monitor for potential conflicting reads and writes to the same address. To further this example, hardware is capable of detecting conflicts based on snoops for reads and writes to cache locations with read and/or write attributes set to indicate the cache locations are monitored, accordingly. Inversely, setting read and write monitors, or updating a cache location to a buffered state, in one embodiment, results in snoops, such as read requests or read for ownership requests, which allow for conflicts with addresses monitored in other caches to be detected.

Therefore, based on the design, different combinations of cache coherency requests and monitored coherency states of cache lines result in potential conflicts, such as a cache line holding a data item in a shared read monitored state and a snoop indicating a write request to the data item. Inversely, a cache line holding a data item being in a buffered write state and an external snoop indicating a read request to the data item may be considered potentially conflicting. In one embodiment, to detect such combinations of access requests and attribute states snoop logic is coupled to conflict detection/reporting logic, such as monitors and/or logic for conflict detection/reporting, as well as status registers to report the conflicts.

However, any combination of conditions and scenarios may be considered invalidating for a transaction, which may be defined by an instruction, such as a commit instruction. Examples of factors, which may be considered for non-commit of a transaction includes detecting a conflict to a transactionally accessed memory location, losing monitor information, losing buffered data, losing metadata associated with a transactionally accessed data item, and detecting another invalidating event, such as an interrupt, ring transition, or an explicit user instruction.

In one embodiment, hardware of processor 900 is to hold transactional updates in a buffered manner. As stated above, transactional writes are not made globally visible until commit of a transaction. However, a local software thread associated with the transactional writes is capable of accessing the transactional updates for subsequent transactional accesses. As a first example, a separate buffer structure is provided in processor 900 to hold the buffered updates, which is capable of providing the updates to the local thread and not to other external threads. Yet, the inclusion of a separate buffer structure is potentially expensive and complex.

In contrast, as another example, a cache memory, such as data cache 950, is utilized to buffer the updates, while providing the same transactional functionality. Here, cache 950 is capable of holding data items in a buffered coherency state; in one case, a new buffered coherency state is added to a cache coherency protocol, such as a Modified Exclusive Shared Invalid (MESI) protocol to form a MESIB protocol. In response to local requests for a buffered data item—data item being held in a buffered coherency state, cache 950 provides the data item to the local processing element to ensure internal transactional sequential ordering. However, in response to external access requests, a miss response is provided to ensure the transactionally updated data item is not made globally visible until commit. Furthermore, when a line of cache 950 is held in a buffered coherency state and selected for eviction, the buffered update is not written back to higher level cache memories—the buffered update is not to be proliferated through the memory system, i.e. not made globally visible, until after commit. Upon commit, the buffered lines are transitioned to a modified state to make the data item globally visible.

Note that the terms internal and external are often relative to a perspective of a thread associated with execution of a transaction or processing elements that share a cache. For example, a first processing element for executing a software thread associated with execution of a transaction is referred to a local thread. Therefore, in the discussion above, if a store to or load from an address previously written by the first thread, which results in a cache line for the address being held in a buffered coherency state, is received, then the buffered version of the cache line is provided to the first thread since it is the local thread. In contrast, a second thread may be executing on another processing element within the same processor, but is not associated with execution of the transaction responsible for the cache line being held in the buffered state—an external thread; therefore, a load or store from the second thread to the address misses the buffered version of the cache line, and normal cache replacement is utilized to retrieve the unbuffered version of the cache line from higher level memory.

Here, the internal/local and external/remote threads are being executed on the same processor, and in some embodiments, may be executed on separate processing elements within the same core of a processor sharing access to the cache. However, the use of these terms is not so limited. As stated above, local may refer to multiple threads sharing access to a cache, instead of being specific to a single thread associated with execution of the transaction, while external or remote may refer to threads not sharing access to the cache.

As stated above in the initial reference to FIG. 9, the architecture of processor 900 is purely illustrative for purpose of discussion. Similarly, the specific examples of translating data addresses for referencing metadata is also exemplary, as any method of associating data with metadata in separate entries of the same memory may be utilized.

Figure 10:
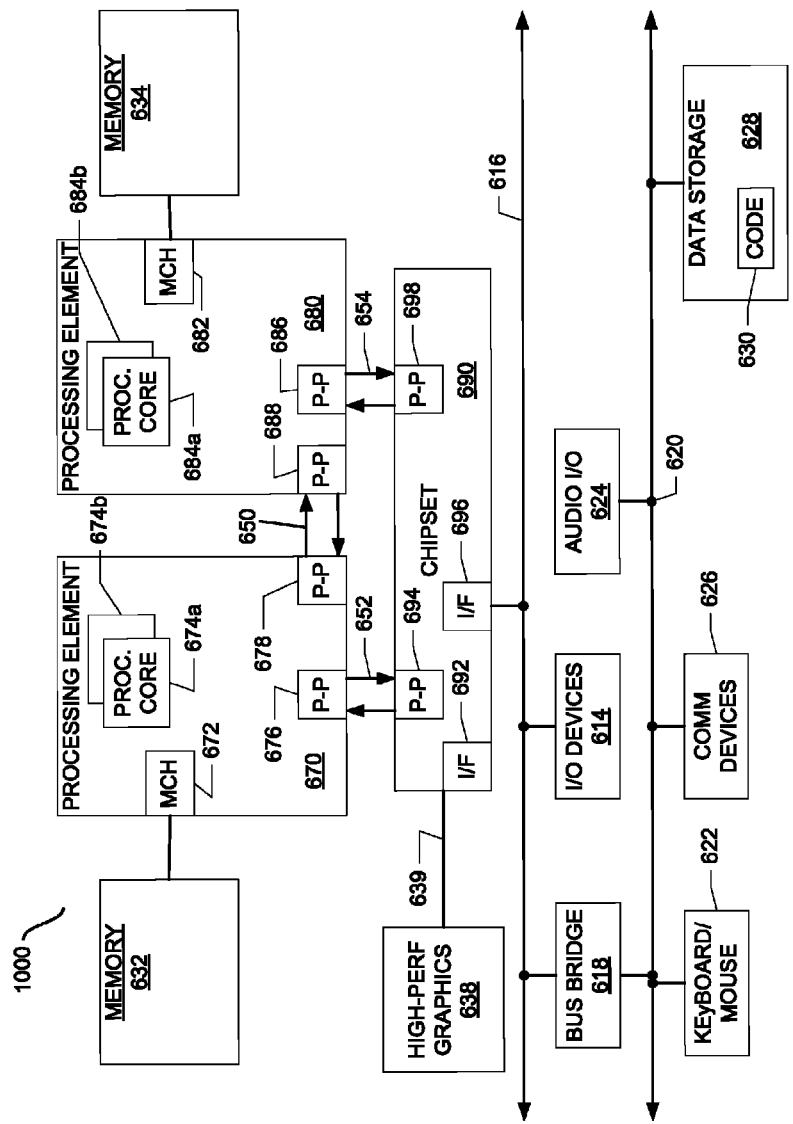
FIG. 10 is a block diagram is a block diagram in accordance with at least one embodiment of a system including multiple processing elements capable of executing multiple software threads concurrently.

Referring now to FIG. 10, shown is a block diagram of a second system embodiment 1000 in accordance with an embodiment of the present invention. As shown in FIG. 10, multiprocessor system 600 is a point-to-point interconnect system, and includes a first processing element 670 and a second processing element 680 coupled via a point-to-point interconnect 650. As shown in FIG. 10, each of processing elements 670 and 680 may be multicore processors, including first and second processor cores (i.e., processor cores 674a and 674b and processor cores 684a and 684b).

Alternatively, one or more of processing elements 670, 680 may be an element other than a processor, such as an accelerator or a field programmable gate array.

While shown with only two processing elements 670, 680, it is to be understood that the scope of the present invention is not so limited. In other embodiments, one or more additional processing elements may be present in a given processor.

First processing element 670 may further include a memory controller hub (MCH) 672 and point-to-point (P-P) interfaces 676 and 678. Similarly, second processing element 680 may include a MCH 682 and P-P interfaces 686 and 688. Processors 670, 680 may exchange data via a point-to-point (PtP) interface 650 using PtP interface circuits 678, 688. As shown in FIG. 10, MCH's 672 and 682 couple the processors to respective memories, namely a memory 642 and a memory 644, which may be portions of main memory locally attached to the respective processors.

Processors 670, 680 may each exchange data with a chipset 690 via individual PtP interfaces 652, 654 using point to point interface circuits 676, 694, 686, 698. Chipset 690 may also exchange data with a high-performance graphics circuit 638 via a high-performance graphics interface 639. Embodiments of the invention may be located within any processor having any number of processing cores, or within each of the PtP bus agents of FIG. 10. In one embodiment, any processor core may include or otherwise be associated with a local cache memory (not shown). Furthermore, a shared cache (not shown) may be included in either processor outside of both processors, yet connected with the processors via p2p interconnect, such that either or both processors' local cache information may be stored in the shared cache if a processor is placed into a low power mode. One or more of the processors or cores in FIG. 10 may include or otherwise be associated with logic 619 to reconstruct sequential execution from a decomposed instruction stream, in accordance with at least one embodiment.

First processing element 670 and second processing element 680 may be coupled to a chipset 690 via P-P interconnects 676, 686 and 684, respectively. As shown in FIG. 10, chipset 690 includes P-P interfaces 694 and 698. Furthermore, chipset 690 includes an interface 692 to couple chipset 690 with a high performance graphics engine 648. In one embodiment, bus 649 may be used to couple graphics engine 648 to chipset 690. Alternately, a point-to-point interconnect 649 may couple these components.

In turn, chipset 690 may be coupled to a first bus 616 via an interface 696. In one embodiment, first bus 616 may be a Peripheral Component Interconnect (PCI) bus, or a bus such as a PCI Express bus or another third generation I/O interconnect bus, although the scope of the present invention is not so limited.

As shown in FIG. 10, various I/O devices 614 may be coupled to first bus 616, along with a bus bridge 618 which couples first bus 616 to a second bus 620. In one embodiment, second bus 620 may be a low pin count (LPC) bus. Various devices may be coupled to second bus 620 including, for example, a keyboard/mouse 622, communication devices 626 and a data storage unit 628 such as a disk drive or other mass storage device which may include code 630, in one embodiment. The code 630 may include ordering instructions and/or program order pointers according to one or more embodiments described above. Further, an audio I/O 624 may be coupled to second bus 620. Note that other architectures are possible. For example, instead of the point-to-point architecture of FIG. 10, a system may implement a multi-drop bus or another such architecture.

Figure 11:
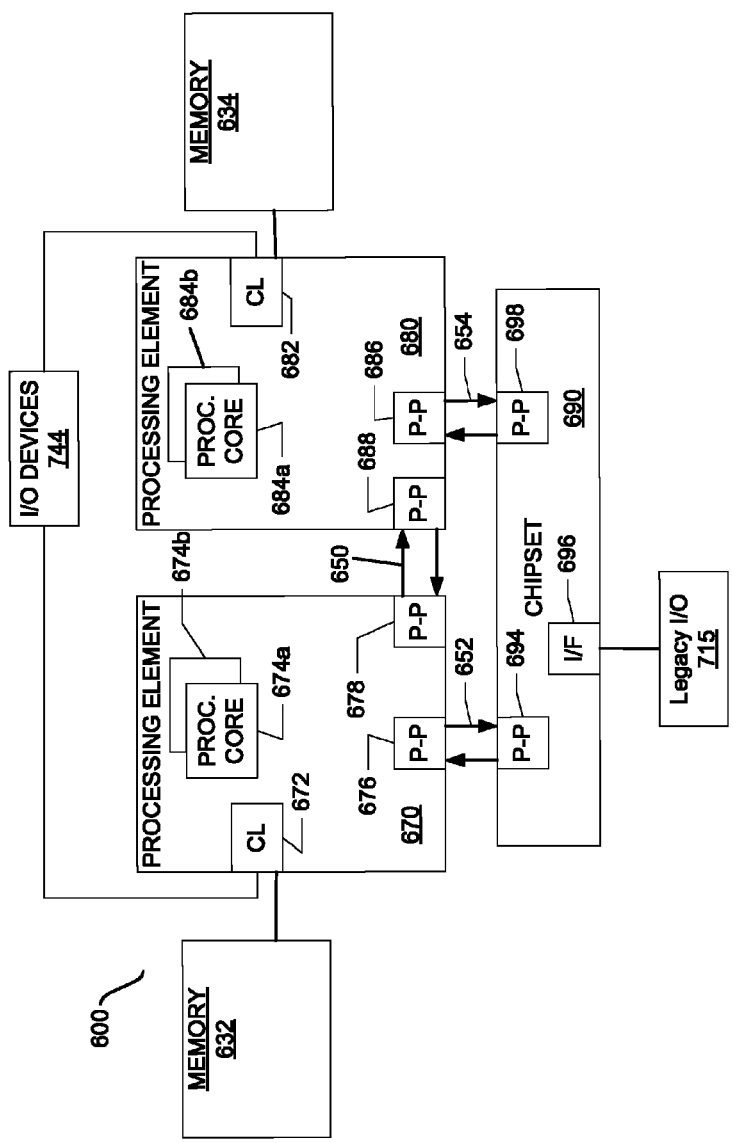
FIG. 11 is a block diagram is a block diagram in accordance with at least one other embodiment of a system including multiple processing elements capable of executing multiple software threads concurrently.

Referring now to FIG. 11, shown is a block diagram of a third system embodiment 700 in accordance with an embodiment of the present invention. Like elements in FIGS. 10 and 11 bear like reference numerals, and certain aspects of FIG. 10 have been omitted from FIG. 11 in order to avoid obscuring other aspects of FIG. 11.

FIG. 11 illustrates that the processing elements 670, 680 may include integrated memory and I/O control logic ("CL") 672 and 682, respectively. For at least one embodiment, the CL 672, 682 may include memory controller hub logic (MCH) such as that described above in connection with FIGS. 5 and 6. In addition. CL 672, 682 may also include I/O control logic. FIG. 11 illustrates that not only are the memories 642, 644 coupled to the CL 672, 682, but also that I/O devices 744 are also coupled to the control logic 672, 682. Legacy I/O devices 715 are coupled to the chipset 690.

Embodiments of the mechanisms disclosed herein may be implemented in hardware, software, firmware, or a combination of such implementation approaches. Embodiments of the invention may be implemented as computer programs executing on programmable systems comprising at least one processor, a data storage system (including volatile and non-volatile memory and/or storage elements), at least one input device, and at least one output device.

Program code, such as code 630 illustrated in FIG. 10, may be applied to input data to perform the functions described herein and generate output information. Accordingly, embodiments of the invention also include machine-accessible media containing instructions for performing the operations of the invention or containing design data, such as HDL, which defines structures, circuits, apparatuses, processors and/or system features described herein. Such embodiments may also be referred to as program products.

In the foregoing specification, a detailed description has been given with reference to specific exemplary embodiments. It will, however, be evident that various modifications and changes may be made thereto without departing from the broader spirit and scope of the invention as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

What is claimed is:

1. A method to filter operations in a processing system that includes multiple thread units for concurrent execution of a plurality of threads, comprising:

for a memory location to be accessed by a first thread unit executing a set of atomic instructions, determining the value of a hardware indicator private to the first thread unit and which cannot be seen or manipulated by another thread unit of the processing system, wherein the hardware indicator is to indicate as a filtering hint whether the memory location has been accessed by a thread during execution of the set of atomic instructions;

performing, responsive to the hardware indicator being a value that indicates no prior access of the memory location by the thread during the execution of the set of atomic instructions, one or more instructions to enforce atomicity of the execution of the set of instructions with respect to at least one other atomic transaction of one other of the plurality of threads, wherein the one or more instructions includes one or more instructions to modify the contents of the hardware indicator; and declining, responsive to the indicator being a value that indicates prior access of the memory location by the thread during the execution of the set of atomic instructions, to execute the one or more instructions to enforce atomicity.

2. The method of claim 1, wherein the memory location is to be read by the first thread unit during execution of said set of atomic instructions.

3. The method of claim 2 wherein the hardware indicator is to indicate whether a read of the memory location has previously occurred during execution by the first thread unit of the set of atomic instructions.

4. The method of claim 1, wherein the memory location is to be written by the first thread unit during execution of said set of atomic instructions.

5. The method of claim 4, wherein said one or more instructions to enforce atomicity includes one or more instructions to acquire a write lock for the memory location.

6. The method of claim 4, wherein said one or more instructions to enforce atomicity includes one or more instructions to record a current value of the memory location in an undo log before said memory location is written by the first thread unit.

7. The method of claim 4 wherein the hardware indicator is to indicate whether a write to the memory location has previously occurred during current execution by the first thread unit of the set of atomic instructions.

8. A method to filter operations in a processing system that includes multiple thread units for concurrent execution of a plurality of threads, comprising:

for a memory location to be read by a first thread unit executing a set of atomic instructions, determining whether the value of a hardware indicator private to the first thread unit and which cannot be seen or manipulated by another thread unit of the processing system indicates that a thread owns a write lock on the memory location during current execution of the set of atomic instructions;

declining, responsive to the hardware indicator being a value that indicates that the thread owns the write lock on the memory location, to execute one or more instructions to enforce atomicity;

determining, responsive to the hardware indicator being a value that indicates the write lock is not held for the memory location by the thread during the execution of the set of atomic instructions, whether a hardware read monitoring mechanism indicates read set consistency for the set of atomic instructions;

performing one or more instructions to handle contention if the read monitoring mechanism indicates that read set consistency for the set of atomic instructions has been lost; and modifying the contents of a second memory location associated with a read log to indicate that the set of atomic instructions has read the first memory location.

9. The method of claim 8, further comprising: modifying the contents of a second hardware indicator private to the first thread unit and which cannot be seen or manipulated by another thread unit of the processing system to indicate that the thread has read the memory location.

10. A method to filter operations in a processing system that includes multiple thread units for concurrent execution of a plurality of threads, comprising:

for a memory location to be accessed by a first thread unit executing a set of atomic instructions that are part of a set of nested atomic transactions, determining the value of a hardware indicator private to the first thread unit and which cannot be seen or manipulated by another thread unit of the processing system, wherein the hardware indicator is to indicate whether the memory location has been accessed by a thread during current execution of the set of atomic instructions or during execution of an outer nest;

performing one or more instructions to enforce atomicity of the execution of the set of instructions with respect to at least one other atomic transaction of one other of the plurality of threads, responsive to the hardware indicator being a value that indicates no prior access of the memory location by the thread during the execution of the set of atomic instructions or an outer nest, wherein the one or more instructions includes one or more instructions to modify the contents of the hardware indicator;

declining, responsive to the indicator being a value that indicates prior access of the memory location by the thread during the execution of the set of atomic instructions or an outer nest, to execute the one or more instructions to enforce atomicity.

11. The method of claim 10, wherein said memory location is to be read by the first thread unit during execution of said set of atomic instructions.

12. The method of claim 11 wherein the hardware indicator is to indicate whether a read of the memory location has previously occurred during the execution of the set of atomic instructions by the first thread unit or an outer nest.

13. The method of claim 10, wherein said memory location is to be written by the first thread unit or an outer nest during the execution of said set of atomic instructions.

14. The method of claim 13, wherein said one or more instructions to enforce atomicity includes one or more instructions to acquire a write lock for the memory location.

15. The method of claim 13, wherein said one or more instructions to enforce atomicity includes one or more instructions to record a current value of the memory location in an undo log before said memory location is written by the first thread unit.

16. The method of claim 13 wherein the hardware indicator is to indicate whether a write to the memory location has previously occurred during the execution by the first thread unit of the set of atomic instructions or an outer nest.

17. A method to filter operations in a processing system that includes multiple thread units for concurrent execution of a plurality of threads, comprising:

for a first memory location to be read by a first thread unit executing a set of instructions that are not atomic, determining whether the first memory location has been previously checked by the first thread unit and has not been written by another thread unit since a time of the previous checking by the first thread unit, including determining whether a value of a hardware indicator private to the first thread unit and which cannot be seen or manipulated by another thread unit of the processing system indicates that the first memory location has been accessed by the first thread unit during the execution of the set of non-atomic instructions;

declining, responsive to determining that the first memory location has been previously checked by the first thread unit and has not been written by another thread unit since the time, to execute one or more instructions to serialize the read of the first memory location by the first thread unit with one or more atomic reads of the first memory location by one or more other thread units; and otherwise, executing the one or more instructions to serialize the read of the first memory location by the first thread unit with one or more atomic reads of the first memory location by one or more other thread units.

18. The method of claim 17 wherein the first memory location represents a base address of a field of an object.

19. The method of claim 17, wherein determining whether the first memory location has not been written by another thread unit since the time further comprises:

determining whether a hardware read monitoring mechanism indicates that the first memory location has not been updated by another thread unit.

20. The method of claim 17, wherein the first memory location represents a base address of an object.

* * * * *